Feb. 10, 1970 D. T. GREEN ET AL 3,494,533
SURGICAL STAPLER FOR STITCHING BODY ORGANS
Filed Oct. 10, 1966 16 Sheets-Sheet 8

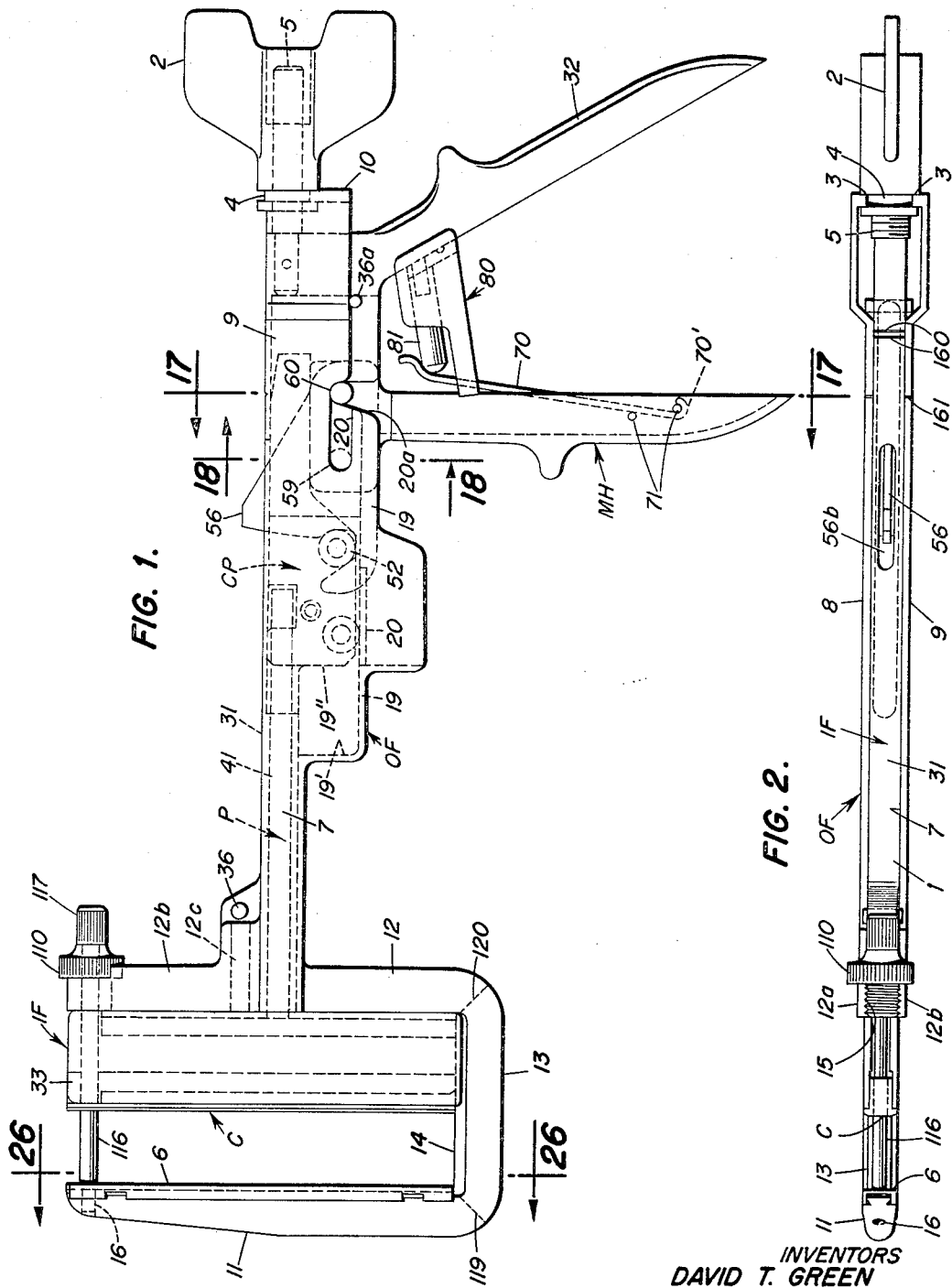

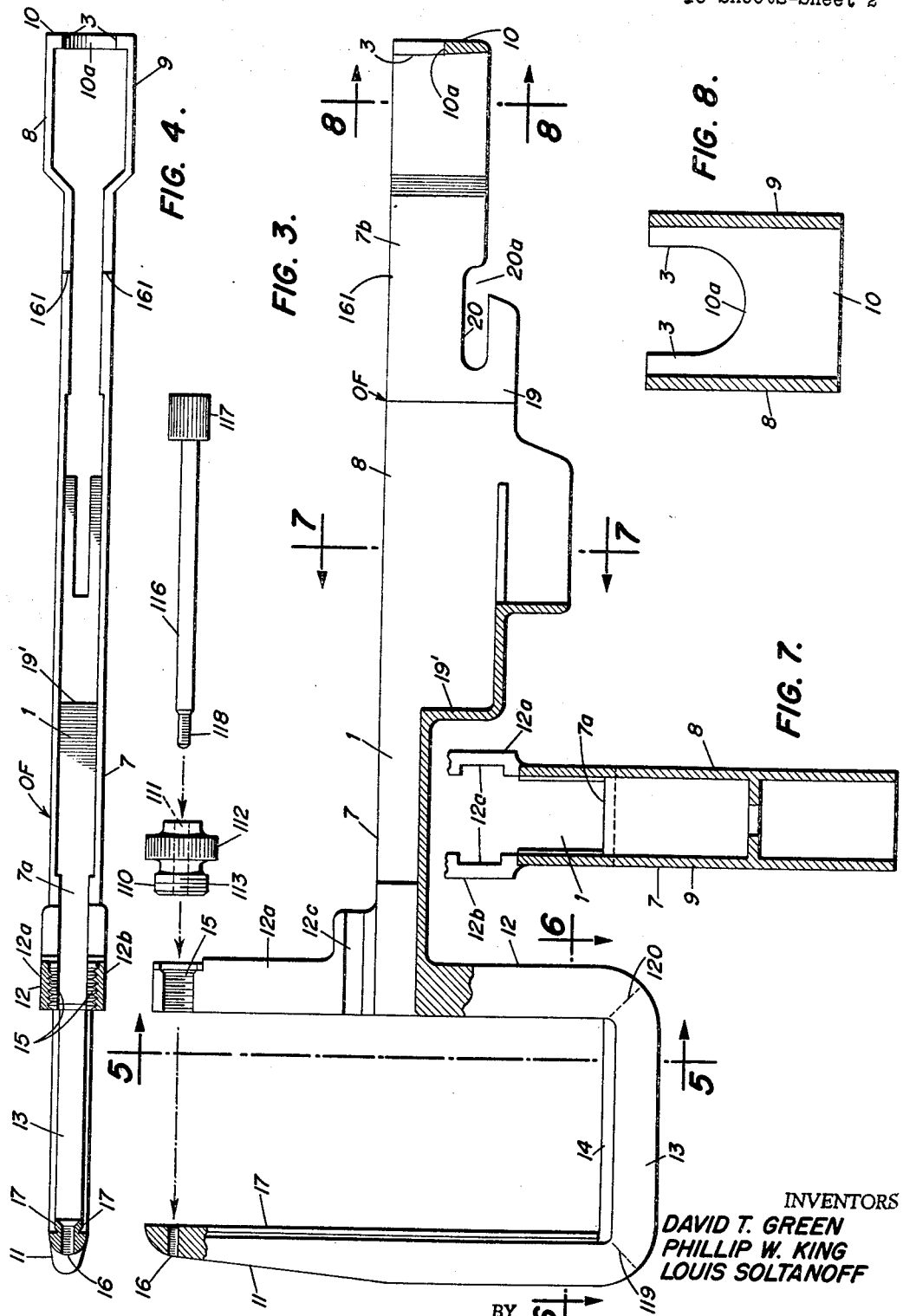

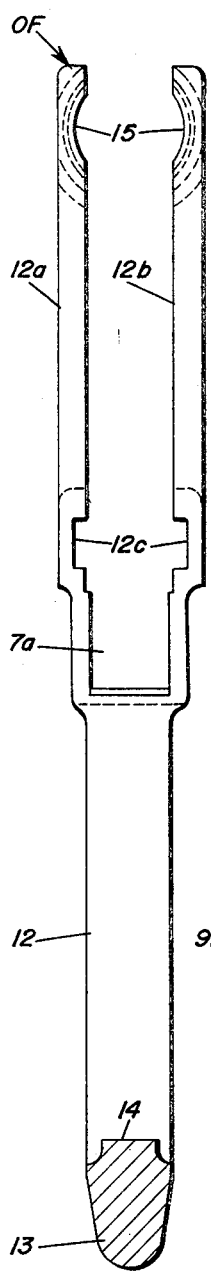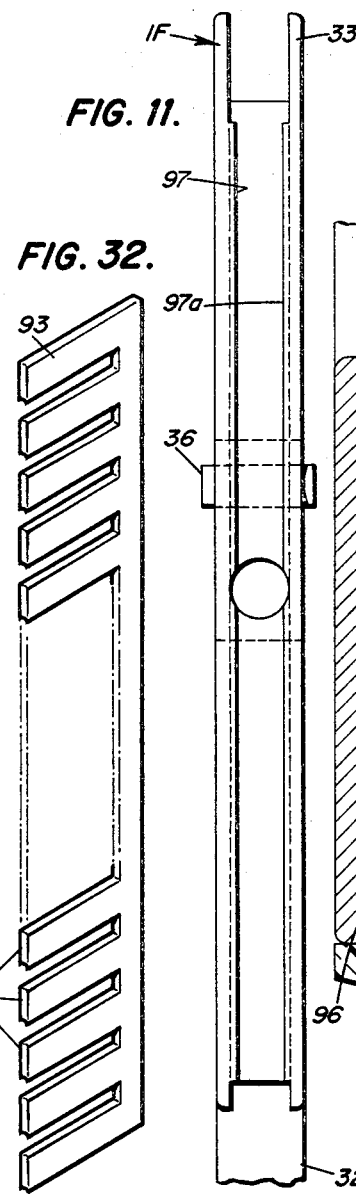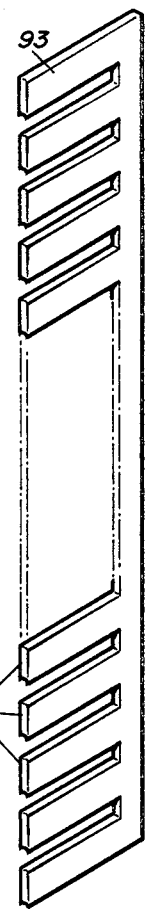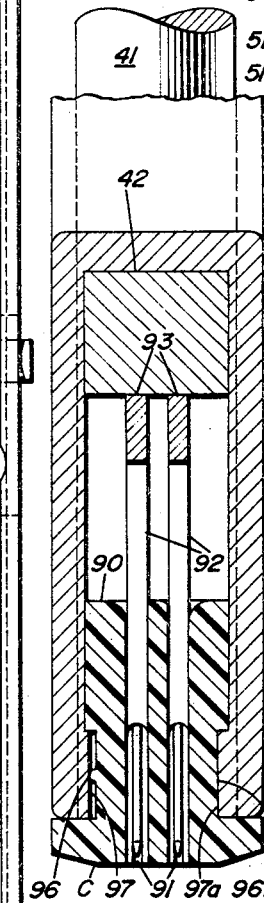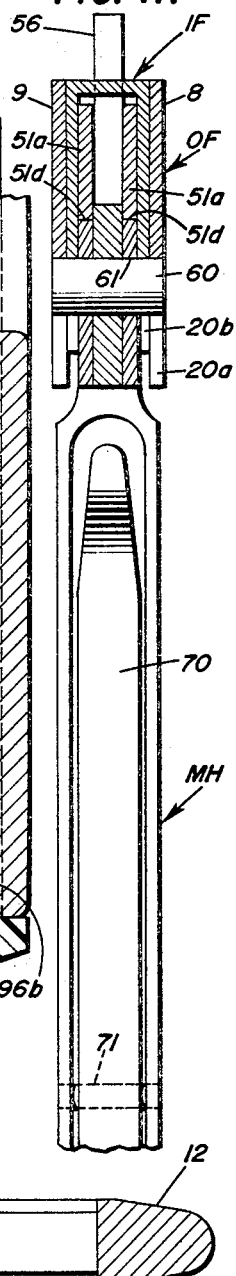

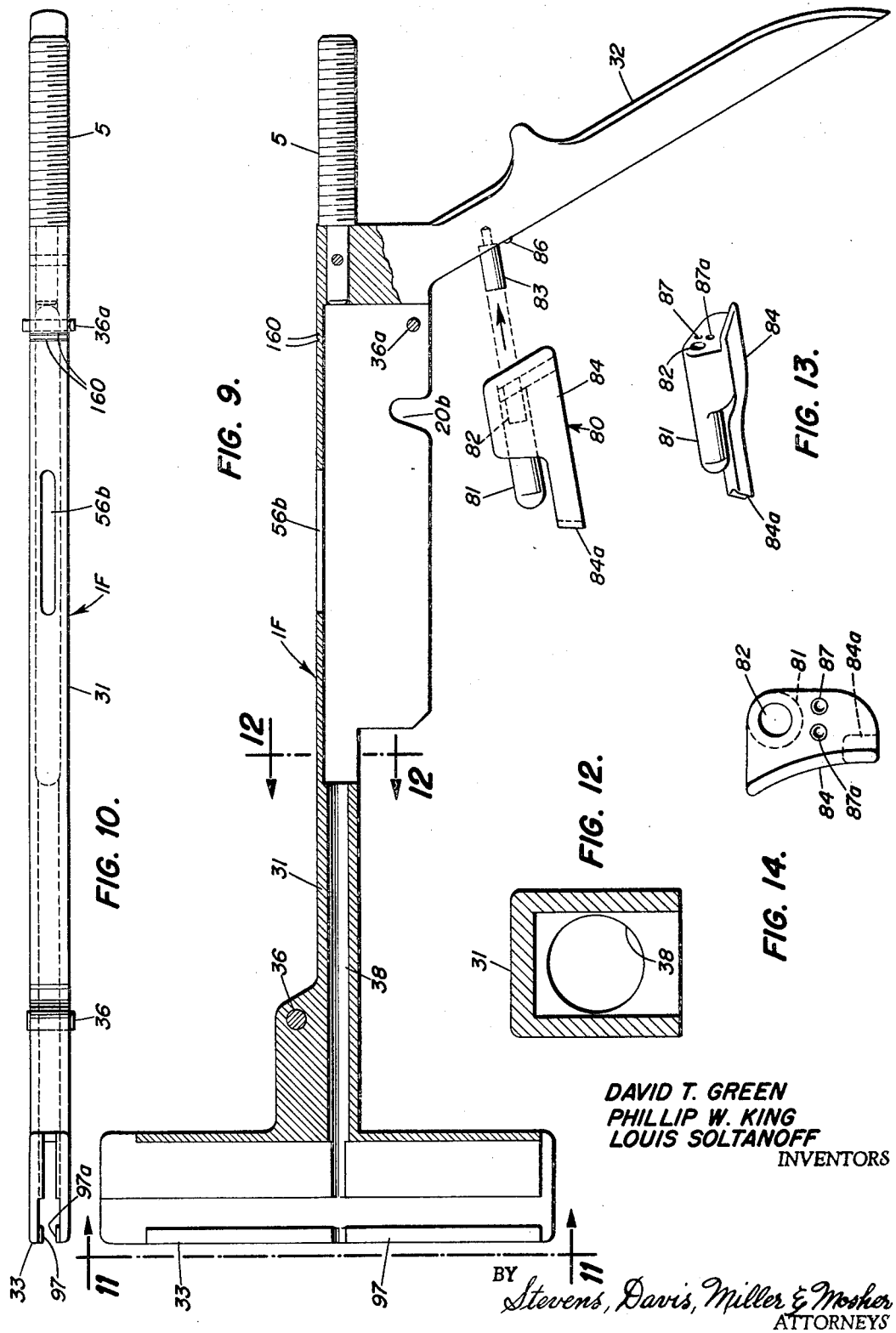

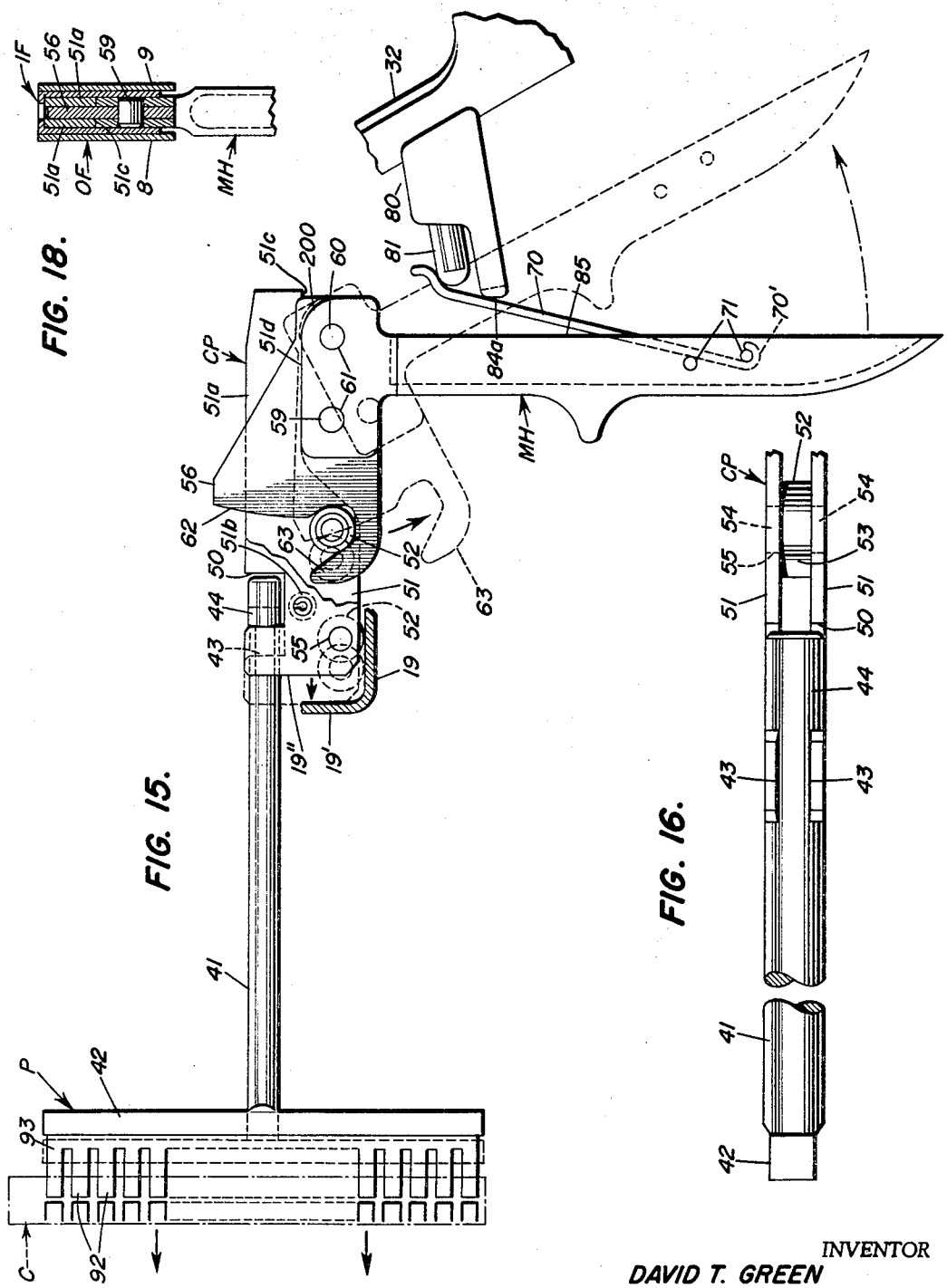

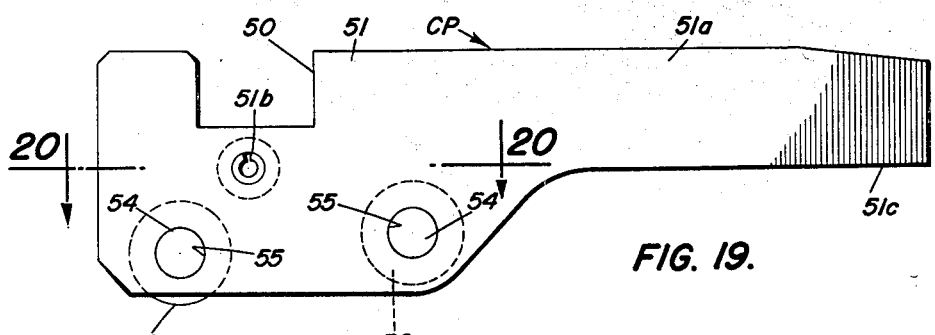
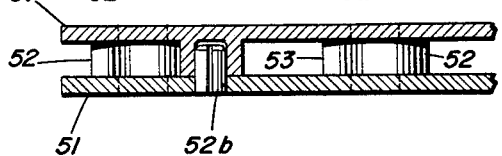
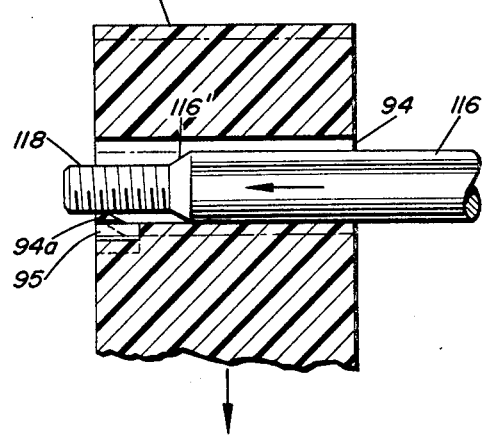
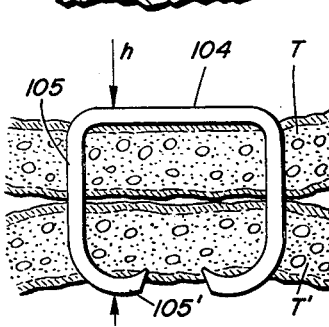
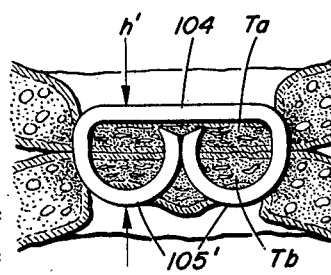
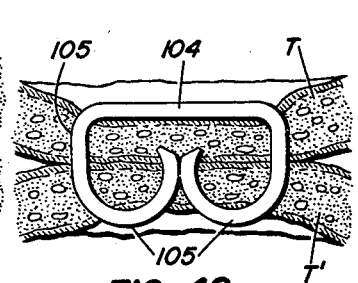

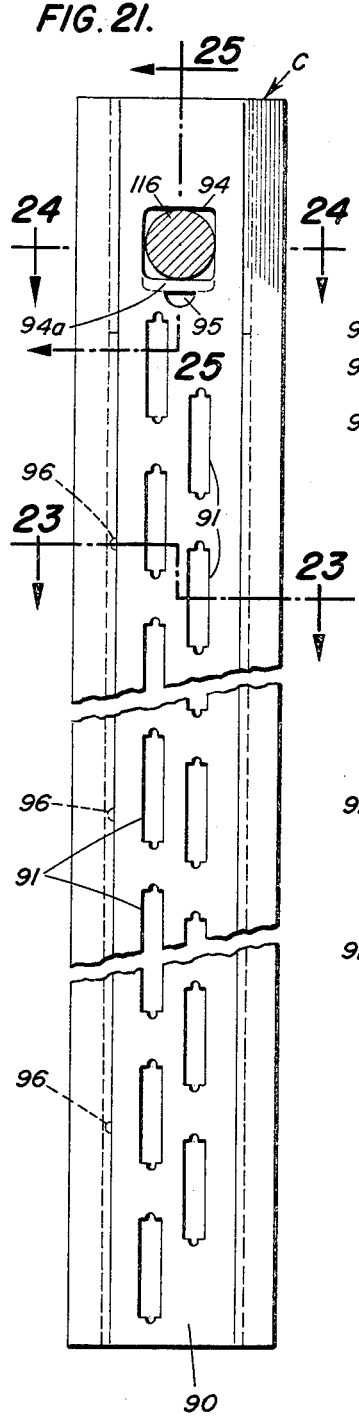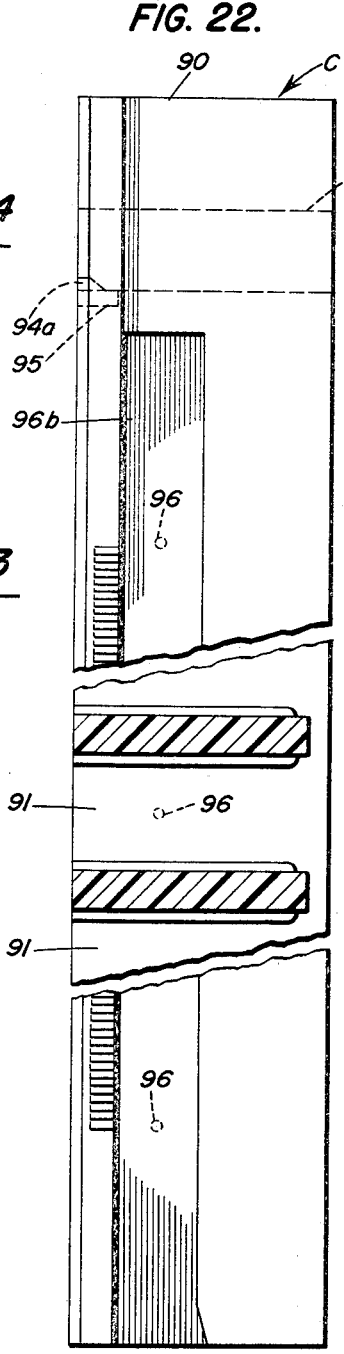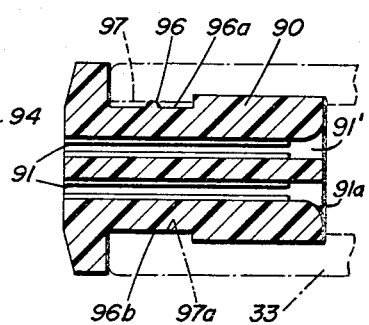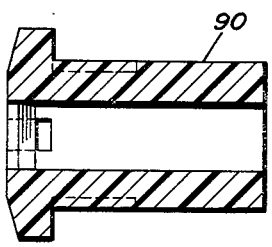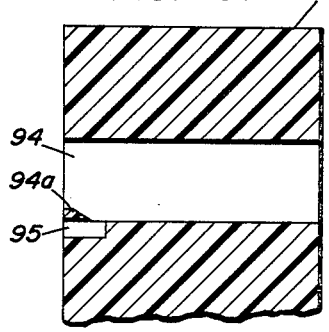

INVENTORS
DAVID T. GREEN
PHILLIP W. KING
LOUIS SOLTANOFF
BY Stevens, Davis, Miller & Mosher
ATTORNEYS Feb. 10, 1970   D. T. GREEN ET AL   3,494,533
SURGICAL STAPLER FOR STITCHING BODY ORGANS
Filed Oct. 10, 1966   16 Sheets-Sheet 9
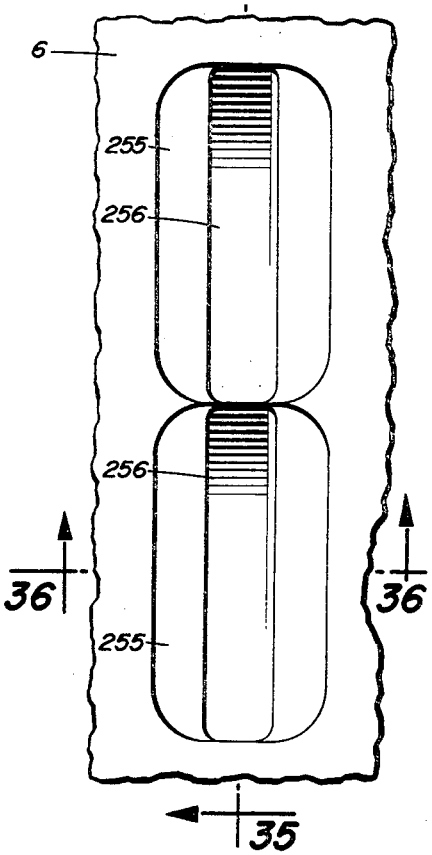
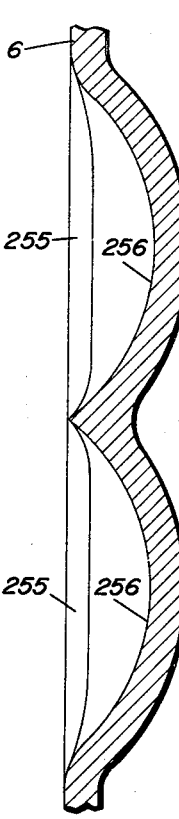
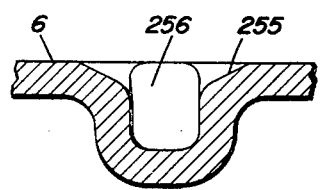
DAVID T. GREEN
PHILLIP W. KING
LOUIS SOLTANOFF
         INVENTORS
BY *Stevens, Davis, Miller & Mosher*
                    ATTORNEYS

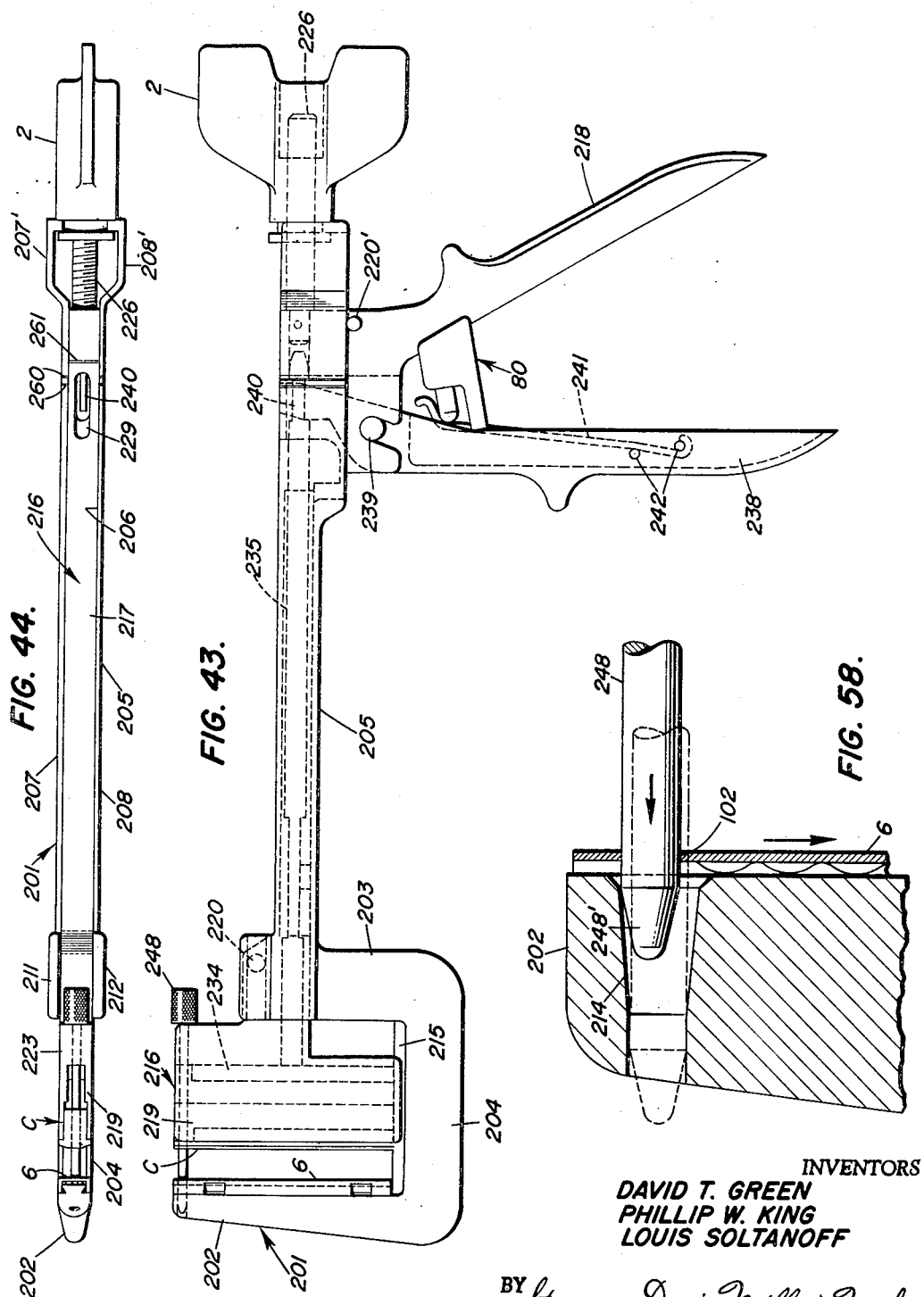

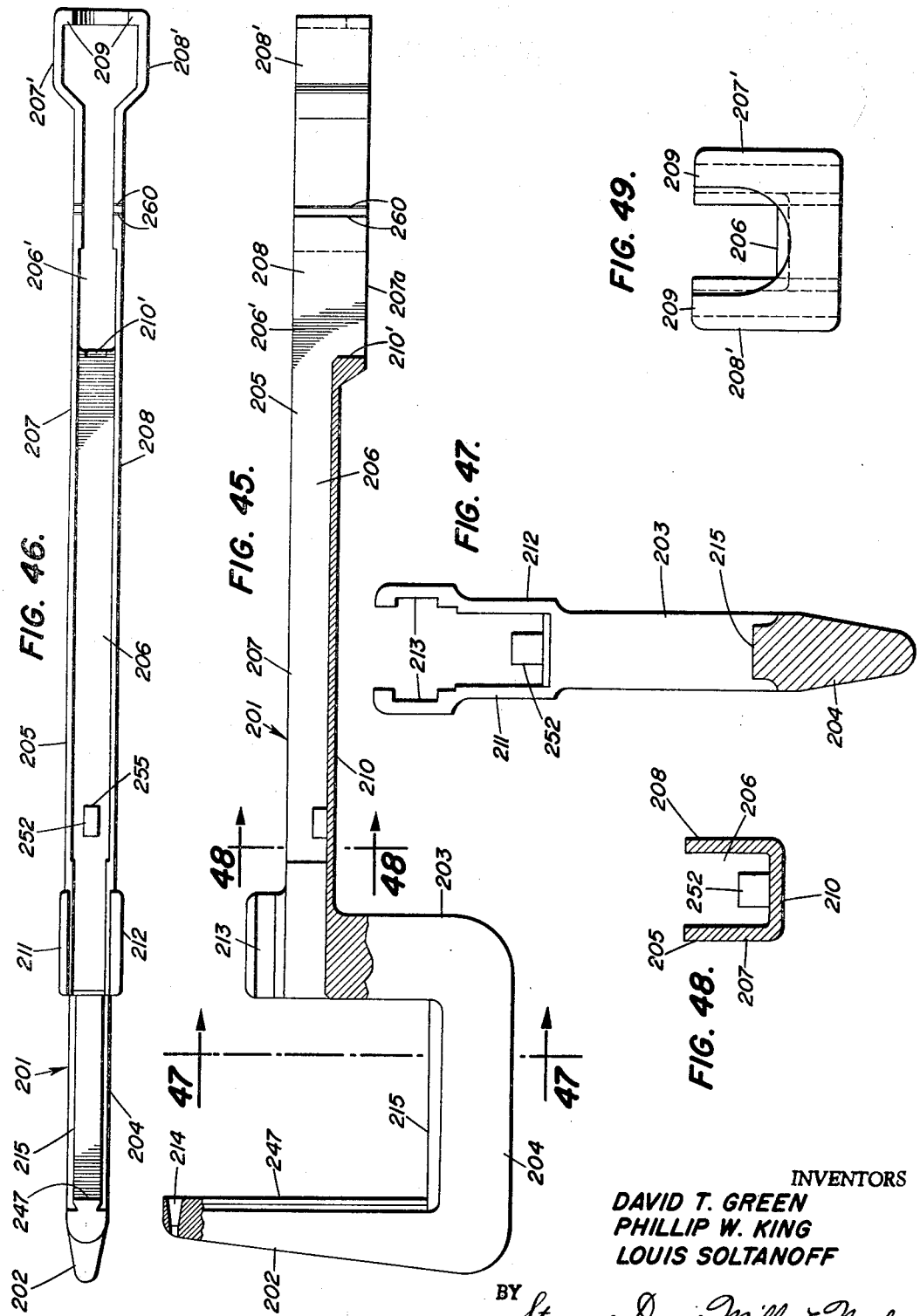

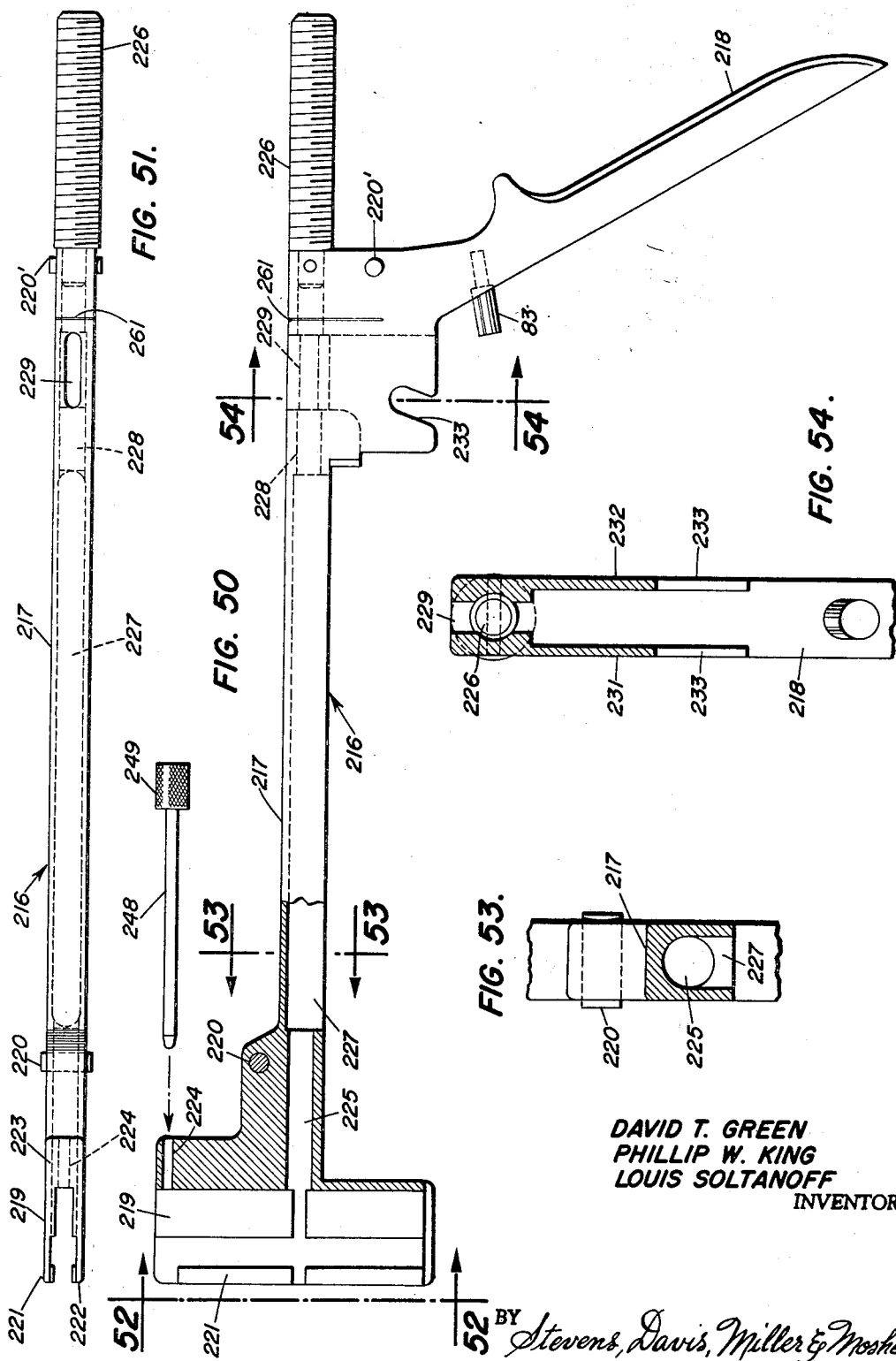

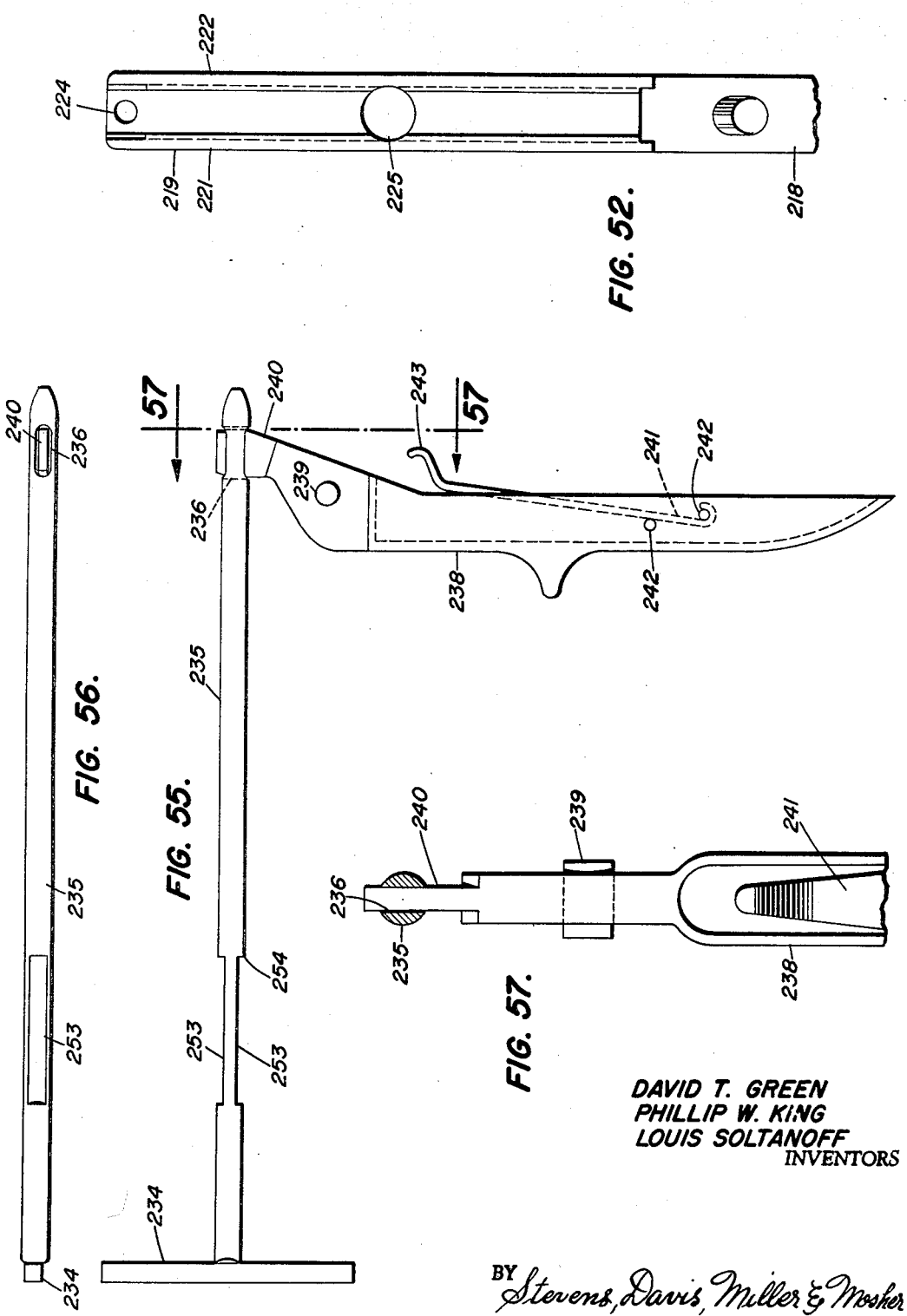

United States Patent Office 3,494,533
Patented Feb. 10, 1970

3,494,533
SURGICAL STAPLER FOR STITCHING
BODY ORGANS
David T. Green, Norwalk, Phillip W. King, Cheshire, and
Louis Soltanoff, Stamford, Conn., assignors to United
States Surgical Corporation, Baltimore, Md., a corporation of Maryland
Filed Oct. 10, 1966, Ser. No. 585,628
Int. Cl. B31b 1/00
U.S. Cl. 227—19                    24 Claims

ABSTRACT OF THE DISCLOSURE

There is disclosed a surgical instrument for combining the action of two hollow body organs having their longitudinal axes paralell to one another. The instrument, properly placed with respect to the two hollow body organs, staples together the walls of said organs. The instrucent is provided with an improved anvil construction which automatically compensates for slight misalignment between the staples and staple-shaping grooves in the anvil.

---

The present application is directed to a stapler device of the type which is employed in surgical operations for stitching together portions of body flesh, tissue, membranes, etc.

In modern surgical practice, it is known to use a stapler machine or device for inserting a series of U-shaped tantalum wire staples into living tissue for the purpose of effecting a lengthwise "stitched" seam. Such staples are inert in the human body and, therefore, may permanently remain therein. A known surgical stapler, for example, is that disclosed in Strekopitov et al., United States Patent 3,080,564.

Surgical staplers, however, because of the delicate and critical circumstances of their use, must meet very high standards of reliability, effectiveness, and precision in operation, and these requirements necessarily have had to be met by relatively complex, carfully machined, and costly instruments. Among the requirements in a surgical stapler, for example, is that its parts be easily dismantable for sterilization purposes. A further requirement is that the staples be easily loadable into the device so that a single instrument may be reused successively during a surgical operation. Still another requirement is that the instrument function easily and without danger of failure, for obvious reasons.

An outstanding limitation which exists in prior known staplers is the fact that a particular staple is restricted to perform sutures on a particular thickness of tissue, each different thickness of tissue requiring a corresponding specially designed stapler. This limitation will be understood upon considering that the stapling of live tissue is quite distinct from the stapling of non-live materials, such as paper, carboard, etc.; wherein the squeezing pressures exerted upon the material layers during and after the stapling operation may vary over a wide range without damaging said layers of non-live materials. In the stapling of live tissue layers, on the other hand, the stapler may only squeeze the interfacing tissue layers together within a limited range of pressing forces, since, obviously, live tissue is quite susceptible to injury. Conversely, the final or bent-up shape of the staple in the case of live tissues must be very accurately predetermined so as to provide positive and firm holding together of the interfacing tissue layers without, however, the staple itself unduly tearing or otherwise injuring the tissue layers. A specific aspect of this is that the staple must not squeeze the tissue layers together so tightly as to prevent or hinder the flow therethrough of body fluids which are essential to the proper healing and grafting together of the tissue layers.

One of the objects of the present invention, therefore, is to provide a surgical stapler which is adapted to properly effect sutures in live tissues whose thicknesses may vary within a range of thicknesses.

Another problem which is inherent in prior known surgical staplers resides in the facility and accuracy with which the device may be successively reloaded for continued stapling operations. The reader is, of course, aware of the fact that surgical operations are oftentimes performed under critical time limitations. Such limitations, therefore, require that either a plurality of preloaded staplers be available to the surgeon for rapid successive utilization or that a single stapler be available which is itself very rapidly reloadable. In this regard, when it is noted that the staplers involved and their associated parts, such as the staple-carrying cartridge, the anvil, and the staple pusher elements, are quite small and not easily manipulable, it is seen that various problems and difficulties present themselves when it is attempted to reload a stapler with a new cartridge and, specifically, difficulties as to the exact alignment of said parts.

Amongst the objects of the present invention, therefore, is that of providing a disposable group of parts, namely: a cartridge, staple pusher elements, and staple-shaping anvil which are all easily assemblable on the instrument in proper alignment relative to each other. Another object, in this regard, is to provide an improved anvil construction which automatically compensates for slight misalignment between the staples and the staple-shaping grooves in the anvil, said grooves being configured so as to lead or guide a misaligned staple properly into said grooves. A still further object in this same regard is to provide improved alignment means in the anvil and in the cartridge whereby thes two members may be easily and accurately aligned with reference to vertical as well as horizontal reference axes on the instrument by means of an alignment pin.

Surgical staplers necessarily must be very accurately designed and manufactured in accordance with very close tolerances, these requirements being necessitated by the smallness of the parts and by the high level of reliability imposed by the medical environment in which such instruments are used. The extreme care and accuracy with which such instruments are made correspondingly increases their cost. It is an object of the present invention, therefore, to provide a convenient and easily determinable reference point in the instrument, to which various of the cartridge measurements may be referred. Specifically, the cartridge according to this invention is provided with resilient protrusions on one lateral surface thereof, said protrusions serving to press the the opposite lateral surface of the cartridge flush against a reference surface on the instrument frame, thus providing a positive and easily established reference plane for various dimensions on said cartridge and eliminating the need to take into account any tolerance between the said opposite cartridge surface the frame reference surface.

Surgical staplers are commonly utilized to effect a plurality of sutures along a single or along a plurality of parallel lines, and the number of staples which are driven into the tissue in a single operation of the stapler may be quite high, for example: over 30 staples may be driven in a single operation of the instrument. At least the following two problems arise in correspondence to the number of staples increasing: (a) the staple driving force which the surgeon must apply to the driving elements is quite high, and the surgeon, if using a prior art instrument, may find that he must use both his hands to drive the staples against the anvil; and (b) the anvil support member upon which the anvil is mounted in parallel relation to the cartridge, since it extends in cantilever fashion from a base member, is subjected to relatively high bending stresses, since said support member must absorb the aforementioned staple driving forces.

Such deformation in the instrument would effectively render it inoperative for further use, since it would thereafter be impossible to again align the staple cartridge and the anvil with each other.

In view of these problems, therefore, it is an object of the present invention to provide an improved surgical stapler wherein: (a) a driving means is included which provides a high enough mechanical advantage so that the surgeon may easily drive all the staples at one time; and (b) a structural arrangement is provided to eliminate or absorb the bending stresses between the anvil support member and base member on which it is mounted.

The bending or curling of staples by their being driven against an anvil requires a varying degree of driving force as the staple is progressively driven against the anvil. The required driving force is relatively low as the staples are being driven through the tissue layers; however, as soon as the staple ends abut against the solid anvil surface so that they must begin to bend, the required driving force rapidly increase up to a peak from which it then rapidly diminishes. The explanation for this is in the simple fact that the resistance to the initial bending is quite high (in the nature of inertia), while said resistance diminishes once the initial bending has occurred.

Surgical staplers of the type herein disclosed comprise a pair of handles, one fixed and the other movable, said handles being gripable by the surgeon's hand and squeezable towards each other, this serving to drive the staple driving members to effect the stapling operation. Since it is highly important that the staples not be pushed out of their cartridge to any extent while the instrument is being positioned preparatory to a stapling operation, a safety catch means is usually provided which serves to prevent any inadvertent movement of the handles towards each other. A deficiency in heretofore known catch means has resided in the fact that they added to the difficulty experienced in cleaning and sterilizing the instrument. Specifically, known safety catch means provided another location for particles of tissue and for blood, etc., to become entrapped. It is an object of the present invention, therefore, to provide an improved safety catch means which is easily disassemblable and, therefore, permits easy cleaning and sterilization of the instrument.

As a further aspect of preventing staples from extending outwardly of the cartridge slots, it is also important that the staples not fall out of said slots either during shipment of the cartridge assembly or during manipulation of the instrument. It is an object of this invention, therefore, to provide a staple shape whereby the staples themselves will resiliently press against the end walls which define the cartridge slots and thereby be firmly held therein.

Surgical staplers should be as completely disassemblable as possible in order to permit thorough cleaning and sterilization thereof after use. In known staplers, therefore, the movable handle is disassemblable from the instrument frame and is releasably held thereon only by means of the handle spring. This arrangement renders the movable handle susceptible to being inadvertently pushed out of its operative engagement in the instrument frame since it is only held therein by the yieldable spring. It is an object of this invention, therefore, to provide a dismantable, movable handle and a mounting means therefor which positively locks said handle in position on the instrument frame.

In surgical staplers it is especially important that the moving parts thereof function smoothly and without the occurrence of any jamming. The accurrence of jamming obviously cannot be tolerated in view of the critical conditions of use. It would be a nightmarish circumstance for a surgeon to be holding a jammed instrument part way through a suturing operation. Conversely, it is highly desirable that such an instrument be operable with a "light touch" in view of the delicacy with which live human tissue must be handled, and such a light touch can only be achieved through smooth operation of moving parts. Such smooth operation is also important from the economical point of view in that it reduces wearing of parts and consequently prolongs the useability of the instrument.

It is a further object of this invention, therefore, to provide a surgical stapler wherein various of the moving parts are properly supported for movement relative to each other so as to avoid any digging-in or other forms of undue abrasion of parts.

The present invention, therefore, is directed to achieving an improved stapler, especially as regards the aforementioned requirements relative to known staplers, such as that disclosed in United States Patent 3,080,564.

Other objects of this invention not specifically mentioned are inherent in the following detailed description of a preferred embodiment, said description being referred to the appended drawings, wherein:

FIGURE 1 is a side elevation of the assembled instrument;

FIGURE 2 is a top plan view of the instrument shown in FIGURE 1;

FIGURE 3 is a side elevation partially in section of the outer frame;

FIGURE 4 is a top plan view of the outer frame;

FIGURE 5 is a sectional view taken along line 5—5 of FIGURE 3, showing the rear leg of the U-shaped jaw of the outer frame;

FIGURE 6 is a horizontal sectional view of the said U-shaped jaw, taken along line 6—6 of FIGURE 3;

FIGURE 7 is a vertical transverse sectional view through the cradle portion of the outer frame, taken along line 7—7 of FIGURE 3;

FIGURE 8 is a sectional view of the rear portion of the outer frame, taken along line 8—8 of FIGURE 3;

FIGURE 9 is a side elevation partially in section of the inner frame of the stapler;

FIGURE 10 is a top plan view of the inner frame seen in FIGURE 9;

FIGURE 11 is a front elevation of the inner frame, as seen from line 11—11 of FIGURE 9;

FIGURE 12 is a transverse sectional view of the inner frame, taken along line 12—12 of FIGURE 9;

FIGURE 13 is an auxiliary view of the safety catch;

FIGURE 14 is a slightly enlarged end view of the safety catch seen in FIGURE 13;

FIGURE 15 is a side elevation of the pusher assembly, cam plate, cam and movable handle;

FIGURE 16 is a fragmentary top plan view of the pusher assembly and cam plate seen in FIGURE 15;

FIGURE 17 is a vertical sectional view of the movable handle, taken along line 17—17 of FIGURE 1;

FIGURE 18 is another vertical sectional view of the movable handle, taken along line 18—18 of FIGURE 1;

FIGURE 19 is a side elevation of the cam plate assembly;

FIGURE 20 is a horizontal sectional view of the cam plate assembly taken along line 20—20 of FIGURE 19;

FIGURE 21 is a front elevation of a staple cartridge;

FIGURE 22 is a side elevation partially in section of said staple cartridge;

Figure 26:
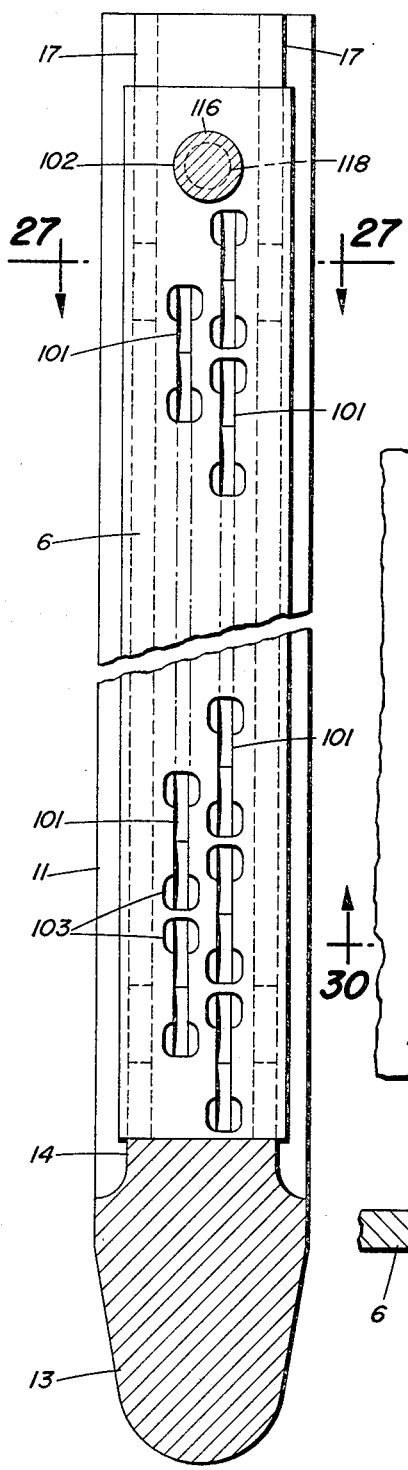
Figure 27:
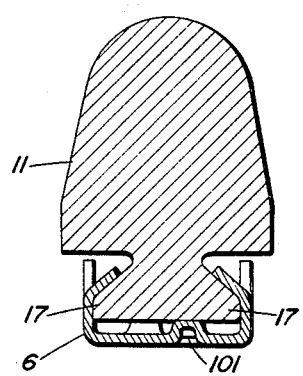
Figure 31:
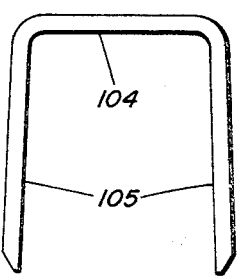
Figure 28:
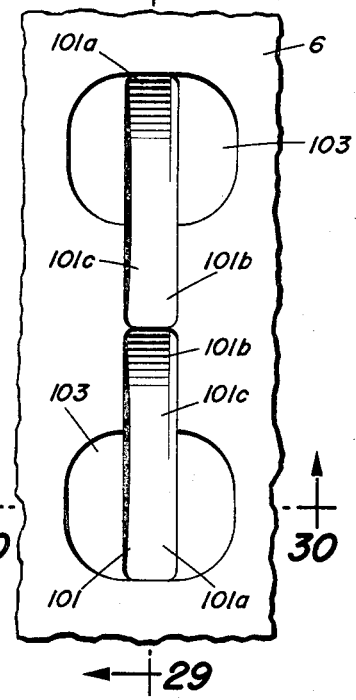
Figure 29:
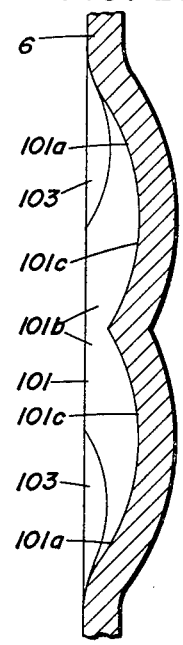
Figure 30:
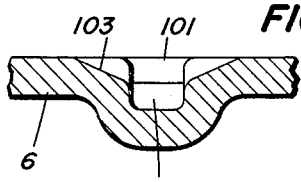
Figure 39:
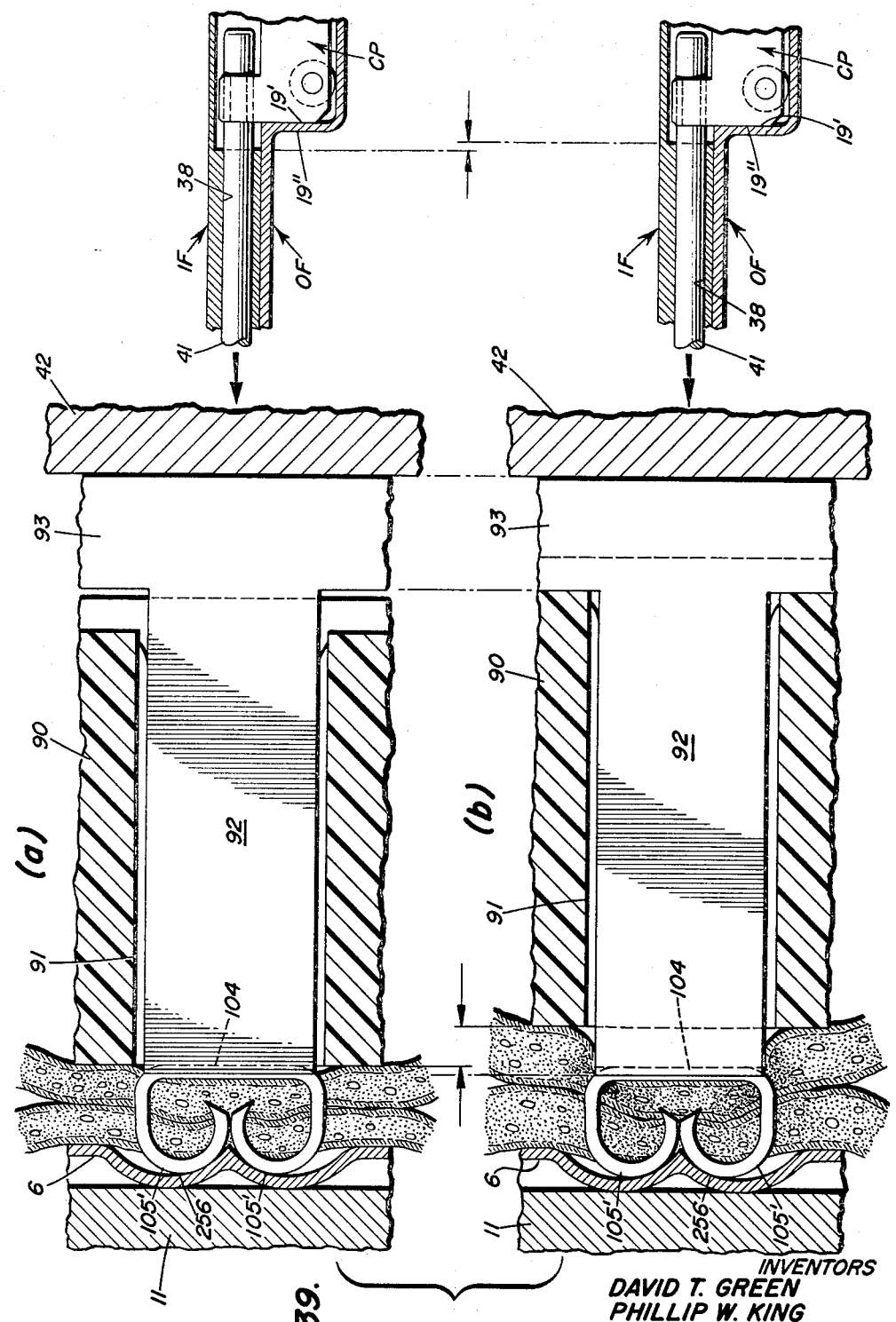
Figure 59:
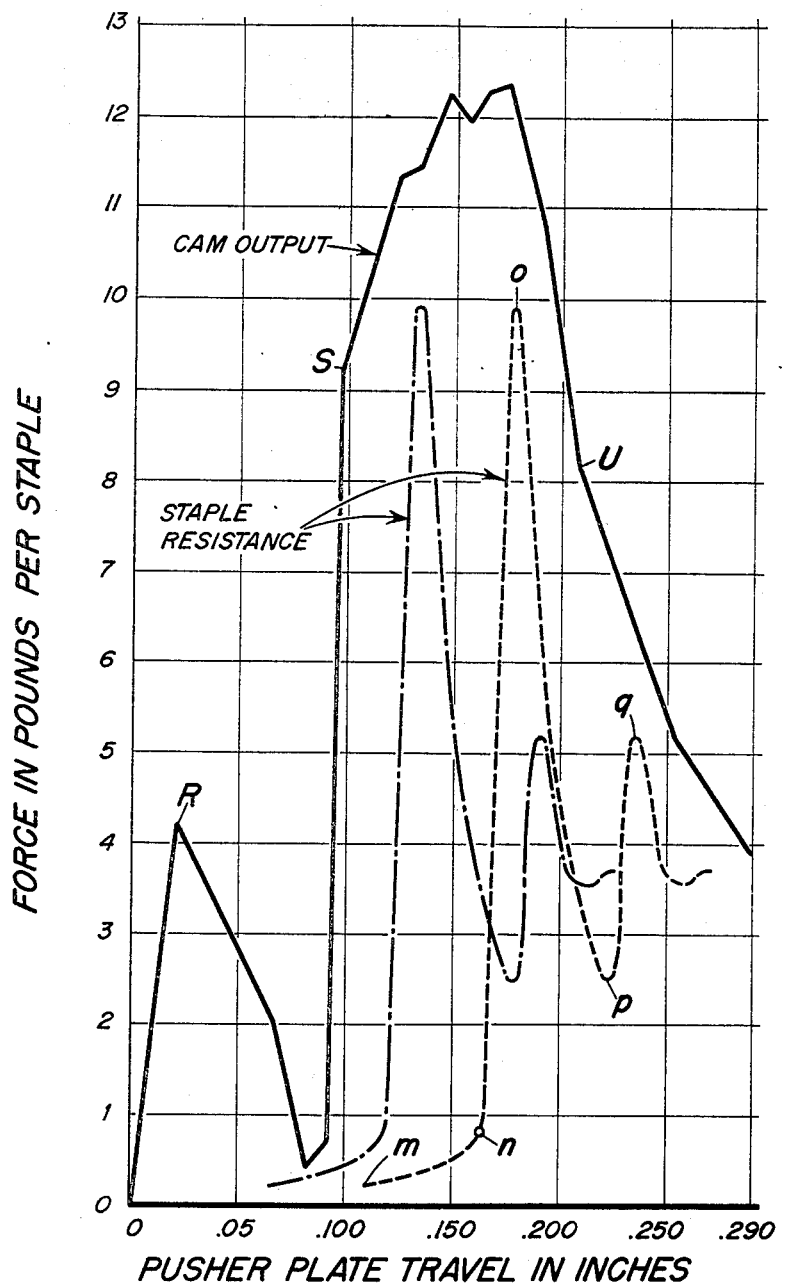
Figure 60:
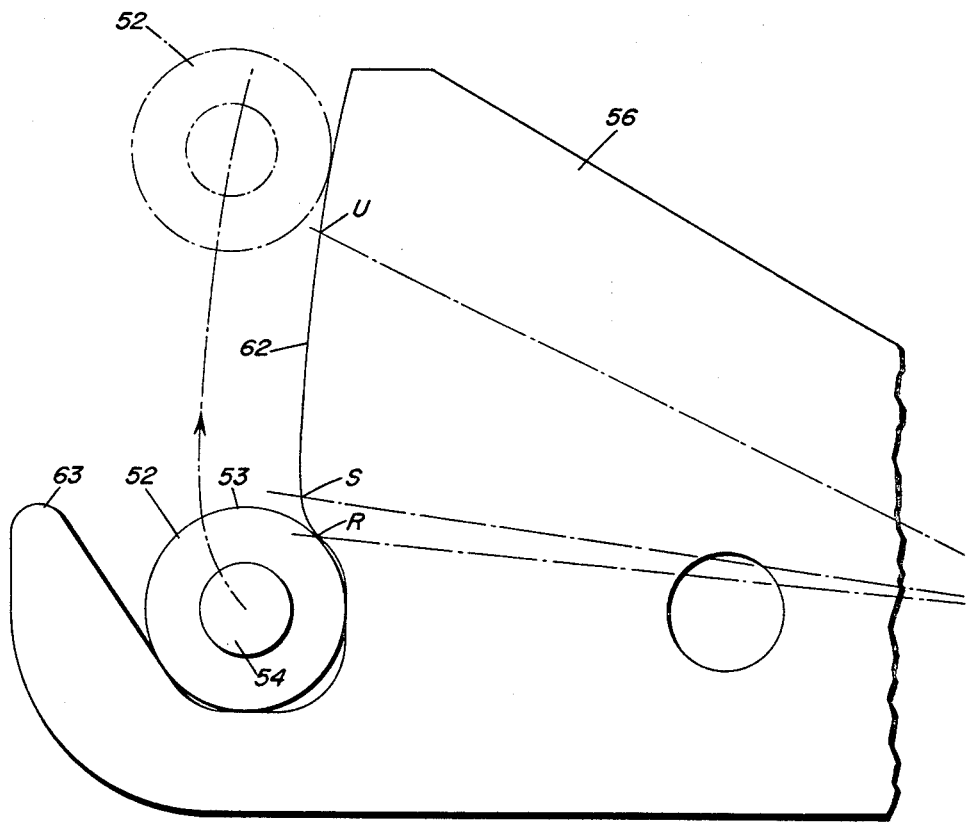

FIGURES 23, 24, and 25 are transverse and longitudinal sectional views of the cartridge taken along corresponding section lines of FIGURE 21;

FIGURE 26 is a vertical transverse sectional view of the stapler jaw, showing a front elevation of an anvil, taken along line 26—26 of FIGURE 1;

FIGURE 27 is a horizontal transverse sectional view of the forward leg of the stapler jaw and the anvil, taken along line 27—27 of FIGURE 26;

FIGURE 28 is an enlarged front elevation of a fragment of an anvil, showing a staple aligning and clinching groove;

FIGURE 29 is a longitudinal sectional view of the groove seen in FIGURE 28, taken along line 29—29;

FIGURE 30 is a transverse section, taken along line 30—30 of FIGURE 26;

FIGURE 31 is an elevational view of a typical staple;

FIGURE 32 is an isometric view of a staple pusher member;

FIGURE 33 is a sectional view of a cartridge assembled in the forward end of the inner frame in operating condition;

FIGURE 34 is an enlarged front elevation of a fragment of another embodiment of an anvil, showing a modified staple aligning and clinching groove;

FIGURE 35 is a longitudinal section oft he groove seen in FIGURE 34 taken along line 35—35;

FIGURE 36 is a transverse section of the anvil, taken along line 36—36 of FIGURE 34;

FIGURE 37 shows the cooperation between the pin 116 and the alignment hole of a cartridge to properly position the cartridge in the instrument;

FIGURE 38 shows the cooperation between the pin 116 and an anvil;

FIGURE 39(a) and (b) show the operation of a pusher plate in clinching a staple to the optimum degree in minimum and maximum tissue gap positions;

FIGURE 40 shows a staple formation that would result from trying to adapt old stapling instruments to a wider than usual tissue gap;

FIGURE 41 shows a staple formation resulting from too tight a clamping of the tissues;

FIGURE 42 shows the staple formation properly clamping tissue which results from the structure of the present instrument;

FIGURE 43 is a side elevation of another embodiment of the present invention;

FIGURE 44 is a top plan view of the instrument seen in FIGURE 43;

FIGURE 45 is a side elevation of the outer frame of the second embodiment;

FIGURE 46 is a top plan view of the outer frame;

FIGURE 47 is a vertical transverse section of the outer frame taken along line 47—47 of FIGURE 45;

FIGURE 48 is a vertical transverse section taken along line 48—48 of FIGURE 45;

FIGURE 49 is a rear end elevation of the outer frame seen in FIGURE 45;

FIGURE 50 is a side elevation of the inner frame of the second embodiment;

FIGURE 51 is a top plan view of the inner frame of the same embodiment;

FIGURE 52 is a front end elevation of the inner frame seen in FIGURE 50 taken along line 52—52;

FIGURE 53 is a vertical transverse section taken along line 53—53 of FIGURE 50;

FIGURE 54 is a vertical transverse section taken along line 54—54 of FIGURE 50;

FIGURE 55 is a side elevation of the pusher assembly and the movable handle of the second embodiment;

FIGURE 56 is a top plan view of the pusher assembly;

FIGURE 57 is a vertical transverse section taken along line 57—57 of FIGURE 55;

FIGURE 58 is a section through the top of the forward leg of the outer frame showing the cooperation between the retaining pin and the tapered hole in said forward leg which cooperate to properly position the anvil;

FIGURE 59 is a graph of the forces exerted by the cam of the preferred embodiment for a given distance of travel of a pusher plate and the pressures required to overcome staple resistance;

FIGURE 60 is an enlarged side elevation of the cam plate of the preferred embodiment correlating certain points on the cam with certain points on the afore-said graph.

With reference to the drawings, wherein the same reference characters identify the identical parts in all figures, the instrument comprises the following main components: the outer frame OF, the inner fram IF, the movable handle assembly MH, the pusher assembly P, and the staple cartridge assembly C.

Summarizing the arrangements of parts, the inner frame IF fits within upper longitudinal recess 1 in outer frame OF, and said inner frame is longitudinally adjusted within said recess by means of wing nut 2 which is rotatably mounted on the outer frame but longitudinally restrained by means of outer frame shoulders 3 extending into groove 4 on said nut. A threaded stud 5 extends rigidly from the end of the inner frame and is threadedly received within said nut whereby rotation of said nut results in longitudinal movement of said stud which in turn moves the entire inner frame along with it.

A disposable cartridge assembly C holding a plurality of staples is removably mounted on the outer end of the inner frame while the pusher assembly P is mounted behind said cartridge assembly for longitudinal sliding movement relative to said inner frame. The movable handle assembly MH is mounted on the inner frame in operational relationship with said pusher assembly whereby actuation of said movable handle to the rear results in said pusher assembly moving forward relative to said cartridge and thereby pushing the staples outwardly of the cartridge and toward the anvil 6 which is removably mounted on the outer frame.

The outer frame OF comprises an elongate cradle portion 7 which in cross section is seen to include internal recess 1 extending longitudinally through portion 7. Rearwardly of recess 1, portion 7 comprises a through opening 7b whose rear end is in the form of a yoke formed by an outward flaring in side walls 8 and 9, which walls are joined by end wall 10 perpendicular to said walls 8 ard 9. End wall 10 includes an upwardly opening notch 10a for rotatably receiving wing nut 2. The forward end of the outer frame comprises a U-shaped jaw portion formed by forward and rear legs 11 and 12 interconnected by cross leg 13, the upper surface of which includes a guide rail 14. The upper end of rear leg 12 is formed by two transversely spaced apart leg portions 12a and 12b which are threaded at 15 near the upper end thereof. The upper end portion of front leg 11 is also internally threaded at 16 in longitudinal alignment with the axis of rear thread 15. The rear face of front leg 11 is formed with rib 17 along its length for receiving the removable anvil 6. It will also be noted that leg portions 12a and 12b include opposed facing grooves 12c extending parallel to the longitudinal axis of the outer frame.

The outer frame also includes a depending plate portion 19 towards the rear end of elongate cradle portion 7, said portion 19 having formed therein a slot 20 extending parallel to the outer frame axis and opening at its rear end in a downward direction at 20a.

The inner frame IF includes an elongate body portion 31 which is intended to be received and held within the internal recess 1 in outer frame portion 7, with fixed handle 32 extending rigidly from the inner frame and downwardly through opening 7b in the outer frame. The forward end of the inner frame comprises a generally rectangular hollow head 33 which is open at its forward end and whose lower end is formed to ride on the guide rail 14. A threaded stud 5 extends rigidly from the rear end of body portion 31 and is threadedly received within internally threaded wing nut 2 which is freely rotatable but which is restrained against longitudinal or axial movement by virtue of shoulders 3 extending into groove 4 formed in the forward end of said nut. It is seen, therefore, that rotation of nut 2 results in axial or longitudinal movement of the inner frame along the outer frame.

The inner frame as seen in FIGURE 12 comprises a downwardly U-shaped cross section in contrast to the outer frame which comprises a corresponding upward U-shaped cross section. The two frames fitting together, therefore, define a closed internal passageway extending longitudinally therethrough.

The inner frame is insertable and removable relative to the outer frame when said inner frame is at its extreme rearward position relative to said outer frame. In this position, the laterally projecting guide pin 36 on the inner frame is rearwardly displaced out of grooves 12c while rear guide pin 36a underlies the flared portion of walls 8 and 9. On the other hand, a slight forward displacement of said inner frame, occasioned by rotation of the wing nut, will bring pin 36 within grooves 12c and pin 36a in sliding contact with the lower edges of walls 8 and 9 whereby said inner frame is longitudinally guided and also locked in axial alignment relative to said outer frame.

A pusher assembly P is mounted within the inner frame for longitudinal movement relative thereto and comprises an elongate pusher rod 41 whose front end is rigidly attached to a narrow rectangular pusher plate 42. The rear end of rod 41 is recessed at 43 at a distance from its rearwardmost end so as to form a hook end portion 44.

Pusher assembly P is fitted within the inner frame with rod 41 extending longitudinally in bore 38 which extends through the inner frame, and with pusher plate 42 being slidably fitted within hollow head 33.

The hook end portion 44 is hooked into upper recess 50 in cam plate CP. Said cam plate is comprised of two identical flat plates 51 separated by identical rollers 52, said plates including a rearwardly extending tail portion 51a. Said rollers comprise a central cam sliding surface 53 and opposed boss portions 54 which are rollingly fitted in holes 55 in the respective plates 51. The forward roller 52 extends downwardly below the lower edge of plates 51 so that surface 53 rides on outer frame portion 19 thereby avoiding any digging-in or jamming of the front edge of said plates into the frame portion 19. A split pin 51b is attached to one of plates 51 and extends between them and into a corresponding sleeve in the other plate, said pin serving to releaseably hold said plates together in side by side, spaced, parallel relationship. Cam 56 extends upwardly between tail portions 51a and is free to pivotally move therebetween. It is, therefore, seen that cam plate CP is easily disassemblable since no parts thereof are rigidly interconnected together. As regards operability, the rollers 52 need not be identical; however, in practice, it is advisable that two identical rollers 52 be used thereby facilitating assembly and disassembly of parts and permitting interchangeability of said parts.

The cam plate CP follows the movements of cam 56 which is rigidly mounted on movable handle MH by means of pins 59 and 60 extending through holes 61 in said cam and corresponding holes in said movable handle. The cam comprises a front cam surface 62 which bears against sliding surface 53 of the rearward one of the rollers 52 as the cam is pivoted counterclockwise about the axis of rear pin 60 while the lower end of the cam surface 62 terminates in a forwardly extending hook 63 which, as the cam returns in a clockwise direction from the dash-line position shown in FIGURE 15, hooks around the surface 53 of the rear roller 52 and thereby pulls cam plate CP rearwardly from its forwardmost position which also is shown in dash lines in FIGURE 15.

The cam surface 62 is configured in accordance with the graphical representation in FIGURE 59 wherein the X-axis denotes forward travel in inches of cam plate CP from its rearwardmost position (that is: the position corresponding to the movable handle being in the solid line position shown in FIGURE 15), this forward travel corresponding to the linear extent to which the staples in the cartridge assembly have been pushed towards the anvil, and the Y-axis denotes the amount of pushing force in pounds per staple required to advance the staples at successive points of said travel.

The two identical dash-lines in the graph represent the successively varying driving force which is required for advancing the staples from their position in the cartridge to their final curled shape, the dash line on the left side corresponding to the maximum tissue gap setting and the dash line on the right side corresponding to the minimum tissue gap setting.

Point $m$ on the dash lines represents the point at which the staple ends first touch the anvil surface, while point $n$ represents the point at which the staple legs 105 first begin to bend or as is said in the industry, "the column begins to break." It is seen that the force required to begin the bending rises very sharply from point $n$ to point $o$ with very little forward advance of the staple. Point $o$ represents the force required to overcome the inertia to bending and once this inertia to bending has been overcome, it is seen that further bending of the staple legs requires a rapidly decreasing amount of force up to point $p$. Up to point $p$ the staple legs have been bent inwardly towards each other, the leg ends moving in a lateral direction relative to the longitudinal axis of the instrument. Point $p$ represents the point at which the staple leg ends have come into contact with each other pursuant to such lateral movement towards each other. It is seen, therefore, that the force requirement now increases again to point $q$ in order to overcome the resistance offered by the two leg ends as they meet each other and as they begin to curl backwardly in a direction parallel to the frame axis. Once this second phase of curling has begun, the force requirement again drops off from point $q$ up until the staple bending is completed to the form shown in FIGURE 42.

The solid line in the graph represents the cam force output which is applicable regardless of the tissue gap setting. It is seen that the cam is designed to provide an output whose range or breadth relative to cam plate stroke is such that it provides the necessary output to accommodate any setting of tissue gap. Various points on the cam output line are labeled in the graph in correspondence to the equivalent labeled points in FIGURE 60 showing the successive pivot positions of the cam.

The meaning of the graph of FIGURE 59 may be analogized to the pushing of an object along a surface. It takes a much greater force to start the object moving from a standing still position than it takes to keep it moving after it has already started to move. The same principle applies to the stapler. It takes a considerably greater force to start the bending or curling of the staple legs than it takes to continue the bending after it has already begun.

It should be noted here that rear handle pin 60 serves not only to hold cam 56 on handle MH, but that it also serves as a pivot pin for said movable handle, said rear pin being insertable and removable from slot portion 20a while the inner frame is at its rearwardmost position relative to the outer frame, and said rear pin resting along slot 20 when the inner frame is at any position forward of said rearwardmost position. In fact, rear pin 60 also assists pin 36a in maintaining the horizontal alignment of the rear end of the inner frame relative to the outer frame, analogously as pin 36 serves to maintain the alignment of the forward end of the inner frame relative to the outer frame. Pin 60 is freely insertable into slot portion 20a on the outer frame which slot portion is transversely aligned with slot 20b in the inner frame while the inner frame is at its rearwardmost position.

An additional function of slot 20 is to provide a means for preventing the pivot axis of the movable handle from being displaced downwardly during the triggering action of said handle. Slot 20, therefore, serves to maintain pin 60 along a fixed horizontal axis.

The lower edge 51c of tail portion 51a rests upon the upper edge 51d of the movable handle and slides therealong as the cam plate CP is moved axially along the inner frame. In this regard, the rear corner of said upper edge is rounded as indicated at 200 so as to provide smooth sliding contact for lower edge 51c as the handle MH is pivoted about the axis of pin 60.

The rolling contact of forward roller 52 along outer frame portion 19 and the sliding contact of tail portions 51a along the upper edge 51d serve to support cam plate CP against any tendency to pivot about the axis of rear roller 52. In this regard, it should be noted that the counterclockwise movement of cam 56 tends to push cam plate CP downwardly along the axis of the rear roller 52, and this downward pushing force is counteracted in a balanced manner by the rolling support of the forward roller and the sliding support of the tail portions, each of which are located on opposite sides of the axis of said rear roller.

In the absence of the afore-described balanced support of the cam plate, said cam plate would pivot about the axis of the rear roller and the lower edges thereof would tend to dig into the surface of outer frame portion 19.

The presently disclosed device also includes an adjustable tissue gap feature which provides for stapling various thicknesses of live tissue. This adjustable tissue gap, namely: the distance between the anvil face 6 and the forward face of the cartridge C at the time the movable handle MH is triggered, may be made to vary (for example, between 0.065 and 0.105 inch) simply through varying the amount to which wing nut 2 is turned down. When pin 60 is moved forwardly all the way against the forward end of slot 20, the gap will be the minimum value, and it can be increased depending upon the distance away from the forward end of slot 20 at which pin 60 is stopped.

It should be understood that the tissue gap is simply the ideal spacing between anvil face 6 and the forward face of cartridge C for a particular thickness of tissue which is to be sutured. The extent of the gap is especially important in the stapling of living tissue as contrasted to the stapling of non-live materials, such as paper, for the following reasons.

Primarily, in order to perform the stapling operation, it is necessary that the interfacing tissue layers be firmly held together between the anvil and cartridge faces. While the squeezing or pressing force which holds the tissue layers must be sufficient to prevent sliding of the layers relative to each other or to the instrument, such force should not be so great that injurious crushing of the tissue layers occurs since such crushing would impede the proper healing of the sutured area.

A second consideration in this regard is especially applicable to the stapling of resilient substances such as live body tissue, rubber, etc., and concerns the force required to inject a staple into such material. If one were to take a solid block of rubber and press downwardly upon the surface thereof with one's finger or a pencil point, one would find that there is relatively little resistance offered by the rubber to the penetrating finger or pencil. This characteristic of resilient materials is explainable in that such materials "flow" away from the point at which force is applied.

If, on the other hand, one were to confine that same rubber block within rigid walls and then push one's finger against an exposed surface thereof, the rubber would not yield and would, in fact, act as if it were a block of rigid material because it would be prevented from "flowing" by the restraining rigid walls.

The above explanation applies to the tissue gap as follows. If the tissue gap is too small for the thickness of tissue which is being stapled, the anvil and cartridge will press the tissue layers together so tightly that "flow" in said layers will be prevented, and the tissue layers, therefore, will act as the aforementioned solid rubber block. When it is attempted to inject the staples into the tissue layers, they will encounter such a high resistance that the surgeon possibly will not be able to complete the stapling operation or he will at least find that it requires an uncomfortably high squeezing force upon the handles to do so, depending upon how tightly the tissue layers are squeezed together between the anvil and cartridge. An adjustment of the tissue gap to increase it slightly would dramatically reduce the tissue resistance to penetration by the staples.

Adjustment of the tissue gap, however, ordinarily would change the final bent-up shape of the staples. As regards the bent-up shape of the staples, the following should be understood.

Primarily, the staples must not squeeze the two tissue layers together to such an extent that circulation in the interfacing tissue layers is cut off because circulation of body fluids, such as blood or other body fluids, through the interfacing tissue layers is essential to maintaining these tissue layers alive and permitting them to heal and graft together. An overly tight pressing together of the two tissue layers by the staples would be analogous to an overly tight tourniquet which would cut off blood circulation to a wounded body limb and result in gangrene in that limb. Therefore, it is essential that the staples hold the tissue layers together without cutting off circulation of fluids through them.

On the other hand, it is equally important that the staples firmly hold and gently press the tissue layers together, since continued contact between them is essential to their healing and grafting together. Therefore, the staples must not loosely hold the tissue layers together, and, especially, they must not hold the layers together so loosely that any degree of separation between them may occur.

In view of the above-mentioned considerations, therefore, a particular staple, such as that shown in FIGURE 31 having legs 105 of a particular length, is bendable to the final configuration which is shown in FIGURE 42, said final configuration being predetermined to be ideal in order to assure firm holding together of the two tissue layers T and T' without choking out circulation between said layers.

Prior known surgical staplers have, therefore, been restricted to being usable for suturing only a particular thickness of tissue since if, for example, the stapler were used for suturing tissues of a greater thickness, either of the following would occur:

(a) The tissue gap could remain unchanged, and, therefore, the final staple shape would remain unchanged; however, the interfacing tissue layers would be damaged by being squeezed too tightly together between the anvil and cartridge since the gap therebetween would be too small for the greater thickness of tissue; or, (b) The surgeon would adjust the stapler to provide a slightly larger tissue gap in order not to damage interfacing tissue layers, but this changing of the gap would correspondingly change the final bent shape of the staple. Specifically, the staple height $h$ between the arrows in FIGURE 40, which shows the final staple shape which results from increasing the tissue gap in prior known staplers, would be increased an amount equal to the increase in tissue gap, whereby the staple curled-back portion 105' would be less hooked in shape than as shown in FIGURE 42. The tissue layers, therefore, in FIGURE 40 would be less securely and less firmly held together than in the case of FIGURE 42, and the possibility of their losing contact with each other and, in fact, of their completely separating from each other as is shown in FIGURE 40 would be greatly increased, such loss of contact or separation obviously negating the whole purpose of the suturing operation and probably leading to serious medical complications.

If, on the other hand, a surgeon attemplted to use a prior art stapler upon tissue whose thickness was less than that for which the stapler was designed, and if he correspondingly could reduce the tissue gap in order to properly grip the thinner tissue between the anvil and cartridge, the result would be as shown in FIGURE 41. In such a case, the fiinal staple height $h'$ would be less than the ideal height needed for permitting free flow of fluids through the interfacing tissue layers T and T' and the staple would, therefore, choke the passages in these layers as is seen at Tb in FIGURE 41.

According to the present invention, on the other hand, the tissue gap may adjusted to vary within a specified range without altering the final bent-up shape of the staple. Whether the thickness of the tissue is the minimum or the maximum within the specified range, the distance between the anvil and the cartridge, that is, the tissue gap, may be adjusted so that the cartridge and anvil will firmly hold the tissue layers together without unduly squeezing and possibly damaging them, and the bentup staple shape will always be the same as that shown in FIGURE 42 so that there is no possibility of the tissue layers coming apart at a later time or of their being squeezed too tightly by the staples.

Regardless of the tissue gap, therefore, the staples will always be curled into an identical configuration because the forward travel of the pusher bar 41 remains the same for all tissue gap settings. This is true because the cam surface 62 is configured to provide the maximum travel of said pusher bar, that is, the travel required to properly bend the staples with the maximum tissue gap. This maximum travel is defined by vertically extending wall 19' on the outer frame, said wall abutting the forward edge 19" of cam plate CP in accordance with pusher rod 41 having traveled forwardly the proper amount.

On the other hand, with the tissue gap set at its minimum value, that is, with the inner frame and pin 60 at their forwardmost position, although cam surface 62 will tends to drive the cam plate CP forwardly to the same extent as previously, so that the pusher bar and its associated fingers 92 would come closer to anvil 6 a distance equal to the change in tissue gap, this does not occur because even with the minimum tissue gap setting, the cam plate CP is still limited by wall 19' to a fixed or constant forward travel.

The tissue gap is determined by the surgeon simply by his turning the wing nut 2 and thereby moving the inner frame forwardly on the outer frame until the index line 161 which is engraved on the outer frame is aligned with either of the index lines 160 on the inner frame or is anywhere therebetween. The respective index lines on the inner frame coincide with the maximum and minimum tissue gaps. The setting for minimum tissue gap also coincides with pin 60 abutting against the forward end of slot 20 so that, practically, only one index line is necessary on the inner frame, that coinciding to the maximum gap setting.

The movable handle is hollowed out to accommodate a flat spring 70 whose upper portion resiliently bears against member 81 of safety catch 80 attached to fixed handle 32.

The present invention also includes a novel safety catch 80 for preventing accidental actuation of the movable handle. This safety catch includes an elongate cylindrical portion 81 whose bore 82 slidingly fits over catch pin 83 rigidly extending from the fixed handle. The catch also includes a lateral surface 84, having a U- or V-shaped front edge 84a, integrally formed along the outer side of cylindrical portion 81, said catch being pivotable on pin 83 from a first position where edge 84a is aligned with edge 85 on the movable handle to a second position where edge 84a is outwardly displaced out of the plane of said edge 85. It is seen, therefore, that in said first position, edge 85 abuts into the forward edge 84a of surface 84 if the movable handle were to be urged towards the fixed handle, while in the second position, the edge 85 can slide past edge 84a and along the inner side of surface 84 with the movable handle being free to be moved towards the fixed handle against thee resistance of spring 70 abutting against member 81. Obviously, spring 70 serves to return the movable handle to its at rest position (away from the fixed handle 32) after release of same. Spring 70 is frictionally held and positioned in the movable handle by means of pins 71. The lower portion of the handle spring 70 fits between pins 71 in the lower part of said handle and includes a hooked end portion 70' which bears against the lower of said pins.

A spring pin 86 is fixedly mounted on the fixed handle adjacent and parallel to pin 83 for engagement with respective detents 87 and 87a in lateral surface 88 which extends between cylindrical portion 81 and lateral surface 84. The detents respectively correspond to said first and second positions of said catch.

A disposable cartridge assembly C comprising a cartridge body 90 of plastic material is removably mounted on the front portion of pusher head 33, said cartridge comprising a generally elongate rectangular body having a plurality of slots 91 therein for holding an individual staple in each said slot. The slots 91 are substantially longer than the staples so that fingers 92 of a pusher member 93 may extend to a sufficient extent into said slots behind the staples so that the member 93 may be supported in said cartridge body 90.

As is seen in FIGURE 23, the rear face of the cartridge body 90 includes vertically extending recesses 91' running along the rows of slots 91. The edges 91a of recesses 91' are flared rearwardly so as to provide a lead-in for the pusher fingers 92 thereby facilitating assembly of pusher member 93 and said cartridge body 90.

The body 90 comprises an alignment slot or hole 94 in its upper end portion, said hole 94 being alignable with the axis of threaded portions 15 and 16 in the outer frame. The front end of the hole 94 is formed with an elevated bridge portion 94a whose purpose will later be described and which is radially elevated or closer to the hole axis than the remaining wall portions of said hole. In order to give bridge portion 94a a degree of radial resiliency, the body 90 is formed with a cavity 95 extending beneath said bridge.

The body 90 is provided with longitudinally spaced nipple portions 96 along only one vertical side 96a thereof, these nipple portions being resiliently compressed or deformed against wall 97 on pusher head 33 (see FIGURE 23) when cartridge assembly C is inserted between the spaced apart walls of said pusher head. This compression of the nipple portions assures that the opposite vertical side 96b of the cartridge body will be pressed flush against the adjacent wall 97a on the pusher head. This flush face-to-face relationship permits the herein disclosed instrument to be engineered and machined with reference to a particular reference surface, namely, wall 97a. In other words, measurements can be referred to wall 97a without having to account for any machining tolerances between wall 97a and cartridge body wall 96b.

An anvil 6 made of metallic material is removably mounted on the rear side of outer frame leg 11. The anvil comprises a groove 101 for each slot 91 and in addition an alignment notch 102 whose axis is aligned with the axis of threaded portions 15 and 16. The opposite staple leg ends enter the grooves 101 at the extreme outer end portions 101a, and as the staple is further pushed against the anvil, the staple end is forced to follow the groove curvature 101c whereby the two legs of each staple are "curled" upwards and towards each other in the inner portions 101b of each groove.

The entry groove portions 101a are surrounded by a lead-in or faired portion 103 whose purpose is to lead the staple ends onto the curved portion 101c of the groove and thereby avoid jamming or other malfunction which would result if no lead-in were provided and if the staple were slightly misaligned relative to the anvil groove. The lead-in fairing 103 could be provided around the entire groove 101 but is, instead, only provided around the entry portion 101a since it is desired to provide maximum guiding of the staple legs as they are being curled upwardly while they are following the groove configuration in portion 101b.

A bushing 110 having a through internal bore 111, a knurled gripping portion 112, and a threaded portion 113 is threaded received in threaded portion 15 on outer frame rear leg 12. A pin 116 also having a knurled head portion 117 and an opposite threaded end portion 118 passes through bore 111 and is threadedly received in threaded portion 16 in outer frame front leg 11.

The purpose of pin 116 is twofold. When it is threaded into portion 16, its knurled head 117 bears against the rear face of bushing 110 and thereby the forward end of the outer frame comprises an integral, rigid box-like structural entity. This is contrasted to known instruments wherein the outer frame forward end constitutes a C-clamp type structure and wherein stresses resulting from the stapling operations result in deformation along corner stress lines 119 and 120 (FIGURE 3). According to the presently disclosed instrument, deformation along stress lines 119 and 120 is avoided since pin 116 serves as a tension member between the upper ends of legs 11 and 12.

Pin 116 also serves as an alignment means for vertically and horizontally aligning the cartridge body 90 with the anvil 100. This alignment is effected as a result of pin 116 passing through alignment holes 94 and 102 in the cartridge body and anvil, respectively. Pin 116 presses downwardly against bridge portion 94a to thereby assure the proper vertical seating of said body 90 in the vertical direction, and said pin also presses downwardly against the half-round upper surface 102 in the anvil thereby downwardly seating said anvil along outer frame leg 11.

It will be seen in FIGURES 37 and 38 that the forward portion of pin 116 includes a tapered portion 116' which performs a downward camming action successively against cartridge bridge 94a and anvil surface 102 as said pin is advanced through the respective alignment openings. It will also be noted from FIGURE 21 that the main body portion of pin 116 is of a diameter which causes it to fit snugly between all four sides of the cartridge hole 94. This snug fitting between the upper and lower walls assures that said pin will tightly press the cartridge downwardly while the tight fitting between the opposite lateral walls serves to maintain the alignment of the cartridge with the anvil in a vertical plane. This vertical plane alignment is very important especially during the performance of the stapling operation at which time forces are exerted tending to twist the cartridge about its vertical axis into a non-parallel position relative to the anvil face. If such twisting forces were not compensated for it would be possible for the instrument to jam with the staples only pushed part way against the anvil.

Pin 116 may be disposable together with the cartridge assembly.

FIGURE 31 shows a staple which is used in an instrument of the type disclosed herein. It should be noted that the staple comprises a back or connecting leg portion 104 and two outwardly flaring side legs 105. Since the staple holding slots in the cartridge are only of a width corresponding to the outer dimension across leg portion 104, the staples are securely held within said slots by the spring action of legs 105 which are necessarily sprung into a parallel relationship by the slot end walls.

The operation of the herein disclosed invention will now be described with specific reference to the first embodiment, variations between this and the second embodiment being obvious from the differences in structure.

Primarily, the cartridge assembly including cartridge 90 preloaded with the staples in the slots 91, pusher member 93, the anvil 6, and the alignment pin 116 all are packaged as a unitary disposable grouping and are received at the hospital in pre-sterilized condition. With the removal of these elements from the package, the assembly of the instrument may begin.

The cam plate is first assembled with the rollers 52 mounted between plates 51. The push rod assembly P is then inserted into the inner frame with rod 41 being inserted rearwardly through bore 38, and the cam plate CP is fitted into the longitudinal recess in the inner frame with the hook portion 44 of the push rod being hooked into recess 50 of said cam plate.

Wing nut 2 is then threaded part way onto stud 5 and the inner frame is then mounted on the outer frame with the fixed handle 32 being lowered through the rear end portion of opening 7b, with cartridge holding head 33 being fitted against the forward face of outer frame leg 12, and with groove 4 in the wing nut embracing the shoulders 3. The safety catch is then mounted on the fixed handle.

The movable handle which has cam 56 rigidly mounted thereon is then fitted onto the two frames by pin 60 being pushed upwardly into aligned slots 20a and 20b and the top end of the cam 56 being inserted upwardly through the recess 1 in the outer frame and through longitudinal slot 56b in the inner frame. In doing this, it is also ascertained that cam hook portion 63 is hooked around the rear roller 52. The wing nut 2 is now turned just sufficiently to advance pins 36 and 36a, respectively, into grooves 12c and under the lower edges of walls 8 and 9 and also to advance pin 60 along the lower edge of slot 20. This locks the movable handle on the frames and also locks the inner frame relative to the outer frame.

The cartridge assembly and the anvil are then mounted respectively on the head 33 and on the leg 11 of the outer frame. Bushing 110 is then screwed into place on read leg 112 and pin 116 is then inserted forwardly through the bushing, the cartridge alignment hole 94, the anvil opening 102, and into the threded hole 116 in forward leg 11, thereby aligning the respective members with each other.

The instrument is now ready for stapling tissues together and the tissues are, therefore, placed between the cartridge front face and the anvil. The wing nut 2 is then turned down bringing the cartridge forward towards the anvil and thereby gripping the tissue layers securely therebetween. The nut rotation is stopped at the point of reaching the desired tissue gap setting which is indicated by index lines 160–161. At this point, the safety catch is pivoted to release position and the movable handle squeezed towards the fixed handle, thereby forcing the staples through the tissue layers and against the anvil. Release of the movable handle permits the spring 70 to force the movable handle to its rest position. The wing nut 2 is then turned back so as to separate the cartridge from the anvil and thereby release the tissue layers from therebetween.

The instrument is ready for immediate reuse simply through unscrewing of pin 116, quick removal of the anvil, cartridge assembly and said pin and throwing away of same, and immediate insertion of a new grouping of anvil, cartridge assembly, and pin 116.

The reason pin 116 is disposed of after each use is that this pin is subjected to bending stresses which may deform it and thereby affect the alignment of the cartridge and anvil were a deformed pin to be reused.

A second embodiment of the surgical stapler is shown in FIGURES 43 to 58. This second embodiment lends itself to smaller overall dimensions relative to the first embodiment. In the following description of the second embodiment, all parts which are identical in configuration to corresponding parts heretofore described as being part of the first embodiment will be identified with reference to the same reference characters.

With reference to the drawing figures, it is seen that this second embodiment also comprises an outer or C-frame 201 whose front end portion is in the form of a C-type clamp having forward leg 202 and rear leg 203 interconnected by cross leg 204. Extending rearwardly from leg 203 is an elongate cradle portion 205 which in cross section is seen to define a U-shaped recess 206 laterally bounded by side walls 207 and 208. These side walls flare laterally outward at their rearward end into further spaced apart wall portions 207' and 208', and the extereme rear ends of these latter wall portions are laterally inwardly directed to form lips 209. The U-shaped recess extends from leg 203 back to the end 210' of bottom wall 210. Between point 210' and the lips 209 the cradle comprises a vertical through opening 206'.

The upper portion of the rear leg 203 of the C-type clamp comprises laterally spaced walls 211 and 212 each of which includes a longitudinally, or horizontally, extending recess 213, each recess facing its opposed counterpart. The front leg 202 extends higher than the rear leg and at its upper end it includes a longitudinally tapered hole 214. The cross leg 204 includes a longitudinally extending rail 215 along its upper side, analogous to rail 14 in the first embodiment.

The inner frame 216 includes an elongate body portion 217 which is intended to be received and held within recess 206 in the outer frame with fixed handle 218 extending rigidly from said inner frame body portion 217 downwardly from the through opening 206'.

Head 219 at the forward end of body portion 217 includes laterally spaced, forwardly extending side walls 221-222 between which the disposable staple carrying cartridge is intended to be held, said cartridge being removable or insertable relative to said head through vertical movement relative to the longitudinal axis of said inner frame.

Pin 220 extends transversely from both lateral sides of the inner frame, said pin being slidable along grooves 213 in the rear leg 203 of the outer frame. Corresponding pin 220' extends from both lateral sides of the inner frame at the rear end thereof, these latter pins being adapted to slide along the lower edges 207a of the walls 207 and 208 forwardly of the flared out portions 207' and 208'.

Head 219 includes a web portion 223 extending transversely at the rear of walls 221 and 222. The upper end portion of this web includes a longitudinal through hole 224 vertically aligned with the longitudinal axis of the frame, while along the axis of body portion 217, said head includes a larger through hole 225 which hole connects rearwardly into inverted U-shaped groove 227 which, in turn, extends rearwardly up to rear hole 228, which is aligned with forward hole 225. Rearward of hole 228, the body portion 217 includes an upwardly and downwardly open slot 229. Extending rigidly longitudinally from the rear end of body portion 217 is a threaded stud 226 which is intended to receive wing nut 2, said wing nut functioning analogously to that of the first described embodiment relative to lips 209 and relative to longitudinal adjustment of the inner frame relative to the outer frame.

The rear portion of inner frame body 217 includes downwardly depending walls 231 and 232 each of which incudes downwardly opening slot 233.

A push rod assembly including a pusher plate 234 and an elongate rod portion 235 is mountable in the afore-described inner frame simply through insertion of the rod 235 rearwardly through holes 225, along groove 227, and finally through hole 228 with plate 234 coming to rest within head 219 against the front face of web 223. In this position, through slot 236 in the rear end portion of rod 235 will be vertically aligned and parallel with slot 229 in the inner frame.

The inner frame, with the push rod assembly inserted therein, may then be assembled onto the outer frame simply by inserting fixed handle 218 downwardly between wall portions 207' and 208' which offer no obstacle to pins 220' passing therebetween, and by seating the inner frame body portion 217 in the U-shaped recess 206 in the outer frame.

The movable handle 238 is then assembled onto the afore-mentioned parts. This handle comprises a pivot pin 239 which is seatably receivable at the end of slot 233, in which position the upper arm 240 of the handle extends upwardly through slot 236 in the push rod and through slot 229 in the inner frame. It will further be noted that the handle comprises a spring 241 which is held in the handle by being passed between pins 242 in the cored out inner portion of the handle. The handle spring is irregular in outline and includes an offset supporting shoulder 243 which rests upon the upper surface on the safety catch cylindrical portion 81. The purpose of the spring in this embodiment is twofold; it serves to releasably maintain pivot pin 239 within slot 233 and it also serves to urge the movable or actuating handle 238 away from the fixed handle 218.

With the parts assembled as indicated above, the wing nut 2 may be rotated in order to move the inner frame forwardly just sufficiently for the pins 220 to enter grooves 213 and for pins 220' to pass below the rear end of edge 207a. This will lock the inner frame to the outer frame so that they cannot come apart from each other.

The staple carrying cartridge 90 may then be slid into place between the side walls 221 and 222 of inner frame head 219. An anvil 6 may correspondingly be slid vertically along suitable guide means 247 on front leg 202 of the C-type clamp. In order to properly seat the cartridge and the anvil on their respective mounting parts and in order to properly align them with each other, a retaining pin 248, having a knob 249 for easy manipulation, is inserted forwardly through hole 224 in the inner frame head 219, through hole 94 in cartridge 90, and finally the end of said pin is seated in tapered hole 214 in forward leg 202 of the C-type clamp after passing through the half-rounded upper opening 102 in the top of the anvil.

The forward portion 248' of the pin is tapered in the same direction as the taper in hole 214 so that said performs a camming action against the walls of said hole to properly align the cartridge and anvil relative to each other and relative to the instrument frame.

When it is desired to perform a stapling operation, the wing nut is turned down all the way in order to bring the head 218 within stapling distance of the anvil. The safety catch is released on the fixed handle, and the movable handle is squeezed towards the fixed handle. As the movable handle is so squeezed, it pivots about pin 239 so that arm 240 of said handle functions as a lever arm to push the push rod assembly forwardly, it being understood that plate 234 acts against a suitable pusher element 93, analogously as in the first embodiment, to push the staples out of the cartridge and against the anvil.

Arm 240 is specially shaped so as to provide a maximum mechanical advantage. In this regard, it should be noted that arm 240 bends backwardly from the lower portion of the handle.

Slot 229 in the inner frame is long enough so as to permit unobstructed pivoting of arm 240 about pin 239.

This second embodiment includes a variable tissue gap features just as the first embodiment. In this second embodiment, the outer frame 201 includes a fixed abutment block 252 located at a forward point along the U-shaped recess 206. The push rod 235, on the other hand, includes peripheral longitudinally extending recesses 253 along its length. Recesses 253 are aligned transversely to the vertical axis of plate 234 and on opposite sides of rod 235 so that the push rod assembly 234–235 is operable in either of two upside-down positions. The block 252 extends into recess 253 and permits the rod 235 to slide longitudinally relative to the outer frame an amount equal to the length of said recess. The rear shoulder 254 of the recess in the rod and the rear end wall 255 on the block abuttingly engage each other at a point in the forward travel of said rod, and thereby is established a fixed extent of longitudinal movement of said rod relative to the outer frame, and, specifically, relative to the anvil.

It is seen, therefore, that the tissue gap (the distance between the forward face on the cartridge and the rear face on the anvil when the handles are squeezed together) may be varied within the limits represented by the index lines 260 engraved on the outer frame vertical walls 207, 208, and the index line 261 engraved on the inner frame simply by varying the amount to which the wing nut is turned down, without, however, changing the final staple configuration because the push rod assembly and, consequently, the pusher plate fingers always are pusher to within the same distance from the anvil.

The push rod assembly is automatically returned rearwardly upon release of the movable handle by the handle spring 241 forcing the handles apart and, consequently, the handle arm 240 pushing rearwardly against the rear end of slot 236 in the rod.

The anvil 6 and cartridge 90 are both analogous to the corresponding parts in the first embodiment, it being understood that various modifications in these parts are applicable to both embodiments. For example, the staple slots may extend horizontally instead of vertically, and the lead-in fairing 255 may extend all the way around the anvil staple shaping grooves 256, this second modification being illustrated in the figure relating to the second embodiment but being also applicable to the first embodiment.

The material of the disclosed device in both embodiments is preferably stainless steel excepting for the cartridge which is of "Lexan" plastic. The staples are of tantalum metal, and the anvil may be made from a variety of suitable materials.

The invention may be embodied in other specific forms without departing from the spirit or essential characteristics thereof. The present embodiments are, therefore, to be considered in all respects as illustrative and not restrictive, the scope of the invention being indicated by the appended claims rather than the foregoing description, and all changes which come within the meaning and range of equivalency of the claims are, therefore, to be embraced therein.

What is claimed is:

1. A surgical stapler comprising: an outer frame, said outer frame comprising a jaw portion including spaced apart vertically extending front and rear leg portions rigidly interconnected by a cross leg extending between the lower ends of said leg portions, an anvil positioned along said front leg portion and a movable pusher member positioned along said rear leg portion, means to move said pusher member in a direction towards and away from said anvil, means mounting a cartridge assembly between said pusher member and said anvil, said anvil and said cartridge and said pusher member being removably mounted on said outer frame and being ermovable therefrom through movement of each in a vertical direction away from said cross leg, a stress member extending between the upper ends of said leg portions, said stress member being removably rigidly connected to said leg portions.

2. The surgical stapler of claim 1, said cartridge assembly comprising a cartridge body having a longitudinal through hole in the upper end portion thereof, a longitudinal through hole in said rear leg portion and a threaded hole in said front leg portion, said stress member comprising an elongate pin having a head at one end and a threaded portion at the other, said pin extending through said hole in said rear leg portion and in said cartridge body and said pin threaded portion being threadedly engaged in said front leg threaded hole with said head bearing against the vertical edge portion of said rear leg portion.

3. The surgical stapler of claim 2, said rear leg portion comprising two transversely spaced leg members having a thread along opposite facing surfaces thereof, a bushing threadedly engaged in said thread, a through bore in said bushing in axial alignment with said front leg threaded hole, an elongate pin threaded at one end and having a head at its other end, said threaded pin end being threadedly engaged in said front leg hole and said pin head abutting against the rear side of said bushing.

4. The surgical stapler of claim 2, said cartridge body through hole including a raised bridge portion at the front end thereof along the lower side thereof, said body through hole being concentric with the longitudinal axis of said elongate pin excepting for said bridge portion, said pin compressingly bearing against said bridge portion with said pin passing through said rear and front leg holes.

5. The surgical stapler of claim 4, said cartridge body being formed with a cavity immediately below said bridge portion whereby said bridge portion si free to flex radially into said cavity.

6. A surgical stapler comprising a pair of manual gripping handles movable relative to each other for the purpose of effecting a stapling operation, a safety catch means for preventing accidental movement of said handles in a direction towards each other, said catch means comprising: a fixed pivot pin on one of said handles extending towards the other thereof, a catch member comprising a bored cylindrical portion pivotally and slidably mounted on said pivot pin, an abutment member extending parallel to said cylindrical portion, said catch means being pivotable on said pin between first and second positions, in said first position said abutment member being in the same vertical plane as an abutment surface on said other handle, and in said second position said abutment member being in a plane displaced from the vertical plane in which lies said abutment surface.

7. The surgical stapler of claim 1, said cartridge assembly comprising a cartridge body made of plastic material, a cartridge mounting head comprising a pair of transversely spaced vertically extending members for receiving said body therebetween, a plurality of nipple members integrally formed along one lateral side of said body, said body fitting snugly between said vertically extending members with the other of said lateral sides thereof being flush against one of said members and said nipple members being compressed between said one lateral side and the other of said vertically extending members.

8. A surgical stapler comprising: an outer frame, an inner frame mounted on said outer frame for longitudinal movement relative thereto, said outer frame comprising an elongate longitudinal rear portion defined by spaced apart side walls, depending wall portions integrally formed on said side walls, a longitudinally extending slot in said depending wall portions opening downwardly at its rear end, a fixed handle on said inner frame, a movable handle having a pivot pin extending laterally therefrom, a downwardly opening slot in said inner frame, said inner frame being movable to a rearward position where said slot therein is aligned with the rear end of the slot in said outer frame depending wall portions, said pivot pin being receivable in the aligned slots and being slidable along said longitudinally extending slot upon movement of said inner frame in a forward direction from said rearward position.

9. The surgical stapler of claim 1, said cartridge assembly comprising a cartridge body having a plurality of staple carrying slots therein, a metallic U-shaped staple in each said slots, said slots having opposite end walls between which the opposed staple legs are confined, said staples having a normal configuration wherein they flare outwardly from their web portion to the free ends of their legs, and said staple legs being pressed towards each other by said end walls to a smaller distance than said staple ends normally rest at.

10. A surgical stapler, comprising: an anvil, a cartridge member in facing relationship to said anvil and adapted to hold a plurality of staples, a pusher means behind said cartridge member adapted to push said staples out of said cartridge member and against said anvil, a drive means for driving said pusher means, said drive means being actuated by a movable handle and providing a mechanical advantage between said handle and said pusher means varying in amplitude along the driving stroke of said handle in direct proportion to the drive force required to push said staples against said anvil.

11. The stapler of claim 10, said drive means comprising a cam fixedly attached to said handle, said handle being pivotable and said cam being pivoted therewith, said cam including a cam surface in sliding engagement with a surface on said pusher means, said cam surface being configured so as to provide said mechanical advantage.

12. The stapler of claim 10, said mechanical advantage increasing from a relatively low value at near the beginning of the driving stroke to a peak value at a point intermediate the ends of the driving stroke and then falling off from said peak value to another relatively low value at near the end of the driving stroke.

13. The stapler of claim 11, said pusher means including an elongate member having opposite end portions one of which is connected to a cam plate and the other of which is connected to a pusher plate, said cam plate including a sliding surface in sliding contact with said cam surface, said pusher plate including a plurality of fingers each extending into a respective staple-holding slot in said cartridge member, said cam plate being movable along a straight line pursuant to pivoting movement of said cam and consequent sliding movement of said cam surface along said sliding surface.

14. The stapler of claim 13, said cam plate comprising two facing parallel plates, a roller rotatably mounted between said plates and serving to maintain said plates in spaced apart relationship, the circumferential surface of said roller constituting said sliding surface.

15. The stapler of claim 14, said two plates comprising a peripheral recess along one longitudinal edge thereof, said elongate member comprising a radially recessed portion along the length thereof fitting closely between said plates with said one end portion being enlarged relative to said radially recessed portion and fitting within said peripheral recess in said plates.

16. A surgical stapler, comprising: an anvil, a cartridge member for holding a plurality of staples, said cartridge member being movable while being maintained parallel to said anvil, means to adjust and to maintain a tissue gap between said cartridge member and said anvil, a pusher means for pushing the staples out of said cartridge and against said anvil while said tissue gap is maintained, stop means defining a closest distance to which said pusher means may be moved towards said anvil, and drive means to move said pusher means up to said closest distance regardless of the extent of said tissue gap between said cartridge member and said anvil within a specified range of tissue gap variation.

17. The stapler of claim 16, said cartridge member and said pusher means being mounted on a movable frame and said anvil being mounted on a fixed frame, said movable frame being slidable along said fixed frame for adjusting said tissue gap, said drive means being adapted to drive said pusher means to a predetermined maximum extent corresponding to a maximum tissue gap, said stop means being mounted on said fixed frame and defining a fixed forwardmost position to which said pusher means may travel relative to said fixed frame.

18. The stapler of claim 17, said drive means comprising a movable handle pivotally mounted on said movable frame, a cam actuated by said handle and pivotable therewith, said pusher means comprising an elongate rod actuated by said cam to move longitudinally along said movable frame, said cam being configured so as to drive said rod to said predetermined maximum extent along said movable frame, one end of said rod comprising finger elements for pushing respective staples against said anvil, said stop means comprising a fixed abutment surface on said fixed frame and a corresponding abutment surface connected to said rod whereby engagement of said surfaces prevents further forward movement of said rod relative to said fixed frame.

19. The surgical stapler of claim 18, said rod being connected to a cam plate which includes a sliding surface in sliding contact with a cam surface on said cam, said cam plate being movable in a straight line pursuant to pivoting movement of said cam and consequent sliding of said cam along said cam plate surface, said cam plate comprising a forward abutment surface which contitutes said abutment surface connected to said rod.

20. The stapler of claim 17, said drive means comprising a movable handle pivotally mounted on said movable frame, said handle comprising a hand gripping portion extending downwardly from the pivot axis thereof and a lever arm portion extending upwardly from said pivot axis, said pusher means comprising an elongate rod one end of which is associated with finger elements which are adapted to push respective staples out of said cartridge and against said anvil, said rod including a longitudinally extending slot therein, said handle arm extending upwardly through said slot whereby pivoting of said handle about its pivot axis imparts a longitudinal driving movement to said rod through said arm acting against a respective end of the slot in said rod, said stop means comprising a fixed abutment surface on said fixed frame and a corresponding abutment surface on said rod adapted to abuttingly engage the first surface at a point corresponding to the maximum forward travel of said rod relative to said outer frame.

21. The surgical stapler of claim 20, said abutment surface on said frame being defined by the rear end of a fixed block on said frame and said abutment surface on said rod being defined by the rear end of a longitudinally extending recess in the surface thereof, said rod being adapted to slide longitudinally relative to said outer frame with said block extending into said recess, the aforementioned sliding movement being limited by said abutment surfaces coming into abutting contact with each other.

22. A surgical stapler comprising frame means including a first member to receive a cartridge loaded with surgical staples and a second member to receive an anvil, a cartridge loaded with surgical staples detachably mounted on said second member, said anvil having a working surface from which a plurality of staple shaping grooves extend into the body of said anvil, at least the portion of the edges of said grooves adjacent their ends being flared into said surface to provide a lead-in for staples and thereby to assure proper alignment with the central axes of said grooves during bending up of said staples notwithstanding minor misalignments of said staples when first contacting the working surface of said anvil, the flared portions of said grooves extending into said surface an amount less than the depth of said grooves so that the bending up of said staples is controlled by the bottom unflared portion of said grooves, and means to bring said cartridge and anvil into a proper working relation and to drive the staples from said cartridge against said anvil to bend up same.

23. The surgical stapler of claim 22 wherein the edges of said grooves are flared only from the outer ends of said grooves to substantially midway between said ends and the middle of said grooves.

24. The surgical stapler of claim 22 wherein said edges of said grooves are flared along their entire length.

References Cited

UNITED STATES PATENTS

| | | | |
|---|---|---|---|
| 1,287,583 | 12/1918 | Greenfield | 227—155 XR |
| 2,167,331 | 7/1939 | Cavanagh. | |
| 3,080,564 | 3/1963 | Strekopitov et al. | |
| 3,269,630 | 8/1966 | Fleischer | 2227—19 XR |

TRAVIS S. McGEHEE, Primary Examiner

U.S. Cl. X.R.

227—155